US010993089B2

(12) United States Patent
Palanisamy et al.

(10) Patent No.: US 10,993,089 B2
(45) Date of Patent: Apr. 27, 2021

(54) APPLICATION DATA DELIVERY SERVICE FOR NETWORKS SUPPORTING MULTIPLE TRANSPORT MECHANISMS

(71) Applicant: Convida Wireless, LLC, Wilmington, DE (US)

(72) Inventors: Suresh Palanisamy, Namakkal District (IN); Prashanth Murthy, Chicago, IL (US); Michael F. Starsinic, Newtown, PA (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

(21) Appl. No.: 16/788,727

(22) Filed: Feb. 12, 2020

(65) Prior Publication Data
US 2020/0186974 A1 Jun. 11, 2020

Related U.S. Application Data

(63) Continuation of application No. 16/050,078, filed on Jul. 31, 2018, now Pat. No. 10,602,322, which is a
(Continued)

(51) Int. Cl.
*H04W 4/14* (2009.01)
*H04W 4/70* (2018.01)
(52) U.S. Cl.
CPC .............. *H04W 4/14* (2013.01); *H04W 4/70* (2018.02)
(58) Field of Classification Search
CPC .......... H04W 4/14; H04W 4/70; H04W 4/60; H04W 60/04; H04W 4/50
See application file for complete search history.

(56) References Cited

U.S. PATENT DOCUMENTS 9,131,330 B2 9/2015 Muhanna et al.
9,497,566 B2 11/2016 Aghili et al.
(Continued)

FOREIGN PATENT DOCUMENTS

CN 102625276 A 8/2012
CN 103782611 A 5/2014
(Continued)

OTHER PUBLICATIONS

3rd Generation Partnership Project; (3GPP), TR 23.862 V12.0.0, "3rd Generation Partnership Project; Technical Specification Group Services and System Aspects; Evolved Packet Core (EPC) enhancements to support interworking with data application providers; Stage 2" (Release 12), Dec. 2013, 23 pages.
(Continued)

*Primary Examiner* — Nam T Huynh
(74) *Attorney, Agent, or Firm* — BakerHostetler

(57) ABSTRACT

An Application Data Delivery Service (ADDS) facilitates application data transfer between applications that may reside in a device domain (e.g., M2M/MTC devices and gateways) and applications residing in a network domain (e.g., an AS or SCS). The ADDS leverages existing 3GPP transport mechanisms, such as NAS, SMS, USSD, and User Plane, and it is configured to select a transport mechanism for delivering application data based on criteria, such as application data characteristics, application/end node characteristics and availability, subscription information, policies of the network, network conditions (such as congestion, node availability) and the like.

20 Claims, 26 Drawing Sheets

Related U.S. Application Data continuation of application No. 15/322,873, filed as application No. PCT/US2015/038978 on Jul. 2, 2015, now abandoned.

(60) Provisional application No. 62/020,639, filed on Jul. 3, 2014.

(56) References Cited

U.S. PATENT DOCUMENTS

| | | |
|---|---|---|
| 2009/0238192 A1 | 9/2009 | Dolganow et al. |
| 2012/0170451 A1 | 7/2012 | Viswanathan et al. |
| 2013/0083653 A1 | 4/2013 | Jain et al. |
| 2013/0083726 A1 | 4/2013 | Jain et al. |
| 2013/0100895 A1 | 4/2013 | Aghili et al. |
| 2013/0142118 A1 | 6/2013 | Cherian et al. |
| 2013/0155954 A1 | 6/2013 | Wang et al. |
| 2013/0212195 A1 | 8/2013 | Bonefas et al. |
| 2013/0273855 A1 | 10/2013 | Cherian et al. |
| 2013/0279372 A1 | 10/2013 | Jain et al. |
| 2015/0264106 A1 | 9/2015 | Baek et al. |
| 2016/0088545 A1 | 3/2016 | Ronneke et al. |
| 2016/0218843 A1 | 7/2016 | Inoue et al. |
| 2017/0311304 A1 | 10/2017 | Lu |

FOREIGN PATENT DOCUMENTS

| | | |
|---|---|---|
| WO | 2012/142618 A2 | 10/2012 |
| WO | 2013/166230 A2 | 11/2013 |

OTHER PUBLICATIONS

3rd Generation Partnership Project; (3GPP), TS 22.368 V12.4.0, "3rd Generation Partnership Project; Technical Specification Group Services and System Aspects; Service requirements for Machine-Type Communications (MTC); Stage 1" (Release 12), Jun. 2014, 23 pages.

3rd Generation Partnership Project; (3GPP), TS 23.040 V12.2.0, "3rd Generation Partnership Project; Technical Specification Group Core Network and Terminals; Technical realization of the Short Message Service (SMS)" (Release 12), Dec. 2013, 209 pages.

3rd Generation Partnership Project; (3GPP), TS 23.060 V12.5.0, "3rd Generation Partnership Project; Technical Specification Group Services and System Aspects; General Packet Radio Service (GPRS); Service description; Stage 2" (Release 12), Jun. 2014, 347 pages.

3rd Generation Partnership Project; (3GPP), TS 23.140 V6.16.0, "3rd Generation Partnership Project; Technical Specification Group Core Network and Terminals; Multimedia Messaging Service (MMS); Functional description; Stage 2" (Release 6), Mar. 2009, 223 pages.

Resnick, P., "Internet Message Format", RFC 2822, Network Working Group, Apr. 2001, 51 pages.

3rd Generation Partnership Project; (3GPP), TS 23.203 V12.5.0, "3rd Generation Partnership Project; Technical Specification Group Services and System Aspects; Policy and Charging Control Architecture" (Release 12) Jun. 2014, 219 pages.

3rd Generation Partnership Project; (3GPP), TS 23.335 V11.0.0, "3rd Generation Partnership Project; Technical Specification Group Core Network and Terminals; User Data Convergence (UDC); Technical Realization and Information Flows; Stage 2" (Release 11), Sep. 2012, 39 pages.

3rd Generation Partnership Project; (3GPP), TS 23.401 V12.5.0, "3rd Generation Partnership Project; Technical Specification Group Services and System Aspects; General Packet Radio Service (GPRS) enhancements for Evolved Universal Terrestrial Radio Access Network (E-UTRAN) access" (Release 12), Jun. 2014, 305 pages.

3rd Generation Partnership Project; (3GPP), TS 23.682 V12.2.0, "3rd Generation Partnership Project; Technical Specification Group Services and System Aspects; Architecture Enhancements to Facilitate Communications with Packet Data Networks and Applications (Release 12)", Jun. 20, 2014, 32 pages.

3rd Generation Partnership Project; (3GPP), TS 27.007 V12.5.0, "3rd Generation Partnership Project; Technical Specification Group Core Network and Terminals; AT command set for User Equipment (UE)" (Release 12), Jun. 2014, 319 pages.

3rd Generation Partnership Project; (3GPP), TS 29.212 V12.5.0, "3rd Generation Partnership Project; Technical Specification Group Core Network and Terminals; Policy and Charging Control (PCC); Reference points" (Release 12), Jun. 2014, 227 pages.

3rd Generation Partnership Project; (3GPP), TS 29.213 V12.4.0, "3rd Generation Partnership Project; Technical Specification Group Core Network and Terminals; Policy and Charging Control signalling flows and Quality of Service (QoS) Parameter Mapping" (Release 12), Jun. 2014, 205 pages.

3rd Generation Partnership Project; (3GPP), TS 29.214 V12.4.0, "3rd Generation Partnership Project; Technical Specification Group Core Network and Terminals; Policy and Charging Control over Rx Reference Point" (Release 12), Jun. 2014, 61 pages.

3rd Generation Partnership Project; (3GPP), TS 29.272 V12.5.0, "3rd Generation Partnership Project; Technical Specification Group Core Network and Terminals; Evolved Packet System (EPS); Mobility Management Entity (MME) and Serving GPRS Support Node (SGSN) related interfaces based on Diameter protocol" (Release 12), Jun. 2014, 133 pages.

3rd Generation Partnership Project; (3GPP), TS 32.270 V11.0.0, "3rd Generation Partnership Project; Technical Specification Group Services and System Aspects; Telecommunication management; Charging management; Multimedia Messaging Service (MMS) charging" (Release 11), Sep. 2012, 64 pages.

3rd Generation Partnership Project; (3GPP), TS 32.296 V12.1.0, "3rd Generation Partnership Project; Technical Specification Group Services and System Aspects; Telecommunication Management; Charging management; Online Charging System (OCS): Applications and interfaces" (Release 12), Dec. 2013, 88 pages.

APPLICATION DATA DELIVERY SERVICE FOR NETWORKS SUPPORTING MULTIPLE TRANSPORT MECHANISMS

CROSS REFERENCE TO RELATED APPLICATIONS

This application is a continuation of and claims the benefit of U.S. patent application Ser. No. 16/050,078 filed Jul. 31, 2018 which is a continuation of U.S. patent application Ser. No. 15/322,873, filed Dec. 29, 2016, which is a National Stage of International Patent Application No. PCT/US2015/038978, filed on Jul. 2, 2015, which claims the benefit of U.S. Provisional Patent Application No. 62/020,639, filed Jul. 3, 2014, the disclosures of which are incorporated herein by reference in their entirety.

BACKGROUND

The 3rd Generation Partnership Project (3GPP) unites a number of telecommunications standard development organizations and provides their members with an environment in which to develop specifications for cellular telecommunications network technologies, including radio access, the core transport network, and service capabilities. 3GPP specifications also provide hooks for non-radio access to the core network, and for interworking with other networks.

The latest evolution of the 3GPP core network architecture for wireless communications is referred to as the Evolved Packet Core (EPC). EPC was first introduced by 3GPP in Release 8 of the standard. It was designed to have a "flat architecture" in order to handle data traffic efficiently from a performance and cost perspective, and few network nodes are involved in the handling of traffic. Protocol conversion is also generally avoided. It was also decided to separate the user data (also known as the "user plane") from the signaling (also known as the "control plane"), which enables network operators to dimension and adapt their networks easily.

FIG. 1 is a basic architecture diagram illustrating a User Equipment (UE) 104 (e.g., a mobile phone or other wireless device) connected to the EPC 102 over E-UTRAN (LTE access network). The Evolved NodeB (eNodeB) 106 is the base station for LTE radio. In this figure, the EPC is composed of four network elements: the Serving Gateway (Serving GW) 110, the Packet Data Network Gateway (PDN GW) 112, the MME 114 and the HSS 116. The EPC may be connected to external networks 108.

The HSS (for Home Subscriber Server) 116 is a database that contains user-related and subscriber-related information. It also provides support functions in mobility management, call and session setup, user authentication and access authorization.

The gateways (Serving GW 110 and PDN GW 112) deal with the user plane. They transport IP data traffic between the User Equipment (UE) and the external networks. The Serving GW 110 is the point of interconnect between the radio-side and the EPC. As its name indicates, this gateway serves the UE by routing incoming and outgoing IP packets. It is the anchor point for intra-LTE mobility (i.e. in case of handover between eNodeBs) and between LTE and other 3GPP accesses. It is logically connected to the other gateway, the PDN GW.

The PDN GW 112 is the point of interconnect between the EPC and external IP networks, such as the Internet. These networks are called PDN (Packet Data Network), hence the name. The PDN GW routes packets to and from the PDNs.

The PDN GW also performs various functions such as IP address/IP prefix allocation or policy control and charging. 3GPP specifies these gateways independently but in practice they may be combined in a single "box" by network vendors.

The MME (for Mobility Management Entity) 114 deals with the control plane. It handles the signaling related to mobility and security for E-UTRAN access. The MME is responsible for the tracking and the paging of UEs in idle-mode. It is also the termination point of the Non-Access Stratum (NAS).

As show in FIG. 1, a UE 104 can reach the EPC 102 using E-UTRAN, however this is not the only access technology supported. 3GPP specifies support of multiple access technologies and also the handover between these accesses. The idea is to bring convergence using a unique core network providing various IP-based services over multiple access technologies. Existing 3GPP radio access networks are supported. 3GPP specifications define how interworking is achieved between an E-UTRAN (LTE and LTE-Advanced), GERAN (radio access network of GSM/GPRS) and UTRAN (radio access network of UMTS-based technologies WCDMA and HSPA).

The architecture also allows non-3GPP technologies to interconnect the UE and the EPC. Non-3GPP means that these accesses were not specified in 3GPP. These technologies include, for example, WiMAX, cdma2000®, WLAN or fixed networks. Non-3GPP accesses can be split into two categories: the "trusted" ones and the "untrusted". Trusted non-3GPP accesses can interact directly with the EPC. Untrusted non-3GPP accesses interwork with the EPC via a network entity called the ePDG (for Evolved Packet Data Gateway) (not shown). The main role of the ePDG is to provide security mechanisms such as IPsec tunneling of connections with the UE over an untrusted non-3GPP access. 3GPP does not specify which non-3GPP technologies should be considered trusted or untrusted. This decision is made by the operator.

The 3GPP network architecture illustrated in FIG. 1 was originally designed to enable communication between devices that are traditionally operated by humans. For example, the 3GPP network is well suited for providing a smart phone with access to a packet switched network such as the internet and a circuit switched network such as a Global System for Mobile Communications (GSM) network. The 3GPP network was not originally designed in a way that is optimized for handling so called machine-to-machine (M2M) communications, also referred to as machine type communications (MTC), in which machines, or devices, communicate with each other over the network, such as communications involving smart metering, home automation, eHealth, consumer products, fleet management, etc.

In Release 11 (R11) of the 3GPP specifications, 3GPP enhanced the interworking capabilities of the UMTS core network for machine type communications/machine-to-machine communications. Interworking refers to a server, or application, interfacing to the core network for the purposes of exchanging information, controlling devices, or monitoring devices, or communicating with devices. FIG. 2 shows the MTC architecture that is presented by 3GPP in TS 23.682 V11.5.0.

As illustrated in FIG. 2, a service capability server (SCS) 212 may provide services to the core network, devices, and applications. The SCS may also be called an M2M Server, MTC Server, a Service Capability Layer, or a Common Services Entity (CSE). An SCS 212 may be controlled by the operator of the home public land mobile network (HPLMN) or by an MTC service provider. An SCS may be deployed inside or outside the operator domain. If an SCS is deployed inside the operator domain, the SCS may be an internal network function and may be controlled by the operator. If an SCS is deployed outside the operator domain, the SCS may be controlled by a MTC service provider.

An SCS may communicate with a machine type communication (MTC) interworking function (MTC-IWF) 210 via a Tsp reference point (i.e., interface). The Tsp reference point is an example of an interface that is used for interworking with the core network.

As further illustrated in FIG. 2, the reference point (i.e. interface) Tsms 202 may connect a short message service (SMS) service center (SMS-SC) 204 to a short message entity (SME) 206. The Tsms reference point is another example of an interface that is used for interworking with the core network. The SMS-SC 204 communicates with the MTC-IWF over a T4 reference point.

As also illustrated in FIG. 2, the SCS 212 may be an entity that may connect to a 3GPP network to communicate with user equipment MTC (UE MTC) application 216, the MTC-IWF 210 in the HPLMN (e.g., as defined by the boundary 218) or a SMS-SC 204 for device triggering. The SCS 212 may offer capabilities for use by one or more application server MTC (AS MTC) applications.

A UE may communicate through the public land mobile network (PLMN), which includes radio access network (RAN) 219, with SCS(s) and/or other MTC UE(s). An MTC UE 214 may host one or more MTC applications 216. The MTC applications may also be hosted on one or more ASs 220/222. The MTC application 216 may be a MTC communication endpoint that may interact with SCSs 212, AS MTC applications, or other UE MTC applications.

An application server (AS) 220/222 may also host one or more MTC applications. An AS may interface with SCS(s) 212 or a GGSN/P-GW 224. The MTC applications on an AS may interact with SCSs, UE MTC applications, or other MTC applications.

The MTC inter working function (MTC-IWF) 210 may hide the internal PLMN topology from the SCS 212. The MTC-IWF may relay and/or translate signaling protocols used between itself and the SCS (e.g., over the Tsp reference point 208) to support MTC functionality (e.g., MTC UE triggering) in the PLMN. For example, the SCS may request that the MTC-IWF send a trigger to a MTC device. The MTC-IWF may deliver the MTC trigger to the MTC device 214 via SMS. The MTC device 216, based on the trigger, may respond to the SCS 212. The MTC device 216 may, for example, respond with a sensor reading. When the MTC device 216 responds to the SCS 212, the MTC device may use a packet data network (PDN)/packet data protocol (PDP) connection to communicate with the SCS 212. The MTC device may connect with the SCS using an IP connection.

The MTC-IWF 210 may authorize an SCS 212, before the SCS may establish communication with a 3GPP network. For example, when the SCS 212 makes a trigger request on the Tsp reference point, the MTC-IWF 210 may check whether the SCS is authorized to send the trigger request and that the SCS has not exceeded its quota or rate of trigger submissions.

As further shown in FIG. 2, a mobile switching center (MSC) 238 is the primary service delivery node for GSM/CDMA, responsible for routing voice calls and SMS as well as other services (such as conference calls, FAX and circuit switched data). The MSC sets up and releases the end-to-end connection, handles mobility and hand-over requirements during the call and takes care of charging and real time pre-paid account monitoring.

A serving general packet radio service (GPRS) support node (SGSN) 234 is responsible for the delivery of data packets from and to mobile devices within its geographical service area. Its tasks include packet routing and transfer, mobility management (attach/detach and location management), logical link management, and authentication and charging functions. The location register of the SGSN stores location information (e.g., current cell, current VLR) and user profiles (e.g., IMSI, address(es) used in the packet data network) of all GPRS users registered with it.

M2M/MTC communications differ from traditional data communications that involve human interaction. For example, M2M/MTC applications that require data communication do not all have the same characteristics. Each type of M2M/MTC application may require different types of communication services. 3GPP TS 22.368 identifies these different service requirements and lists different MTC features to provide these services. For example, the MTC Feature 'Low Mobility' is intended for use with MTC Devices that do not move, move infrequently, or move only within a certain region. The MTC Feature 'Time Controlled' is intended for use with MTC Applications that can tolerate to send or receive data only during defined time intervals and avoid unnecessary signaling outside these defined time intervals. The MTC Feature 'Small Data Transmissions' is intended for use with MTC Devices that send or receive small amounts of data. The MTC Feature 'Infrequent Mobile Terminated' is intended for use with MTC Devices that mainly utilize mobile originated communications. The MTC Feature 'MTC Monitoring' is intended for monitoring MTC Device-related events. The MTC Feature 'Secure Connection' is intended for use with MTC Devices that require a secure connection between the MTC Device and MTC Server/MTC Application Server. Lastly, the MTC Feature 'Group Based' applies to a group of MTC devices, and includes group based policy, group based addressing, etc.

In existing 3GPP networks, application layer data communication is mainly supported through the packet domain and through SMS. Several different transport mechanisms are available, including (i) packet domain (via the SGi and Gi reference points, (ii) short message service (SMS), (iii) multimedia messaging service (MMS), and (iv) the Non-Access Stratum (NAS).

With respect to packet domain messaging, the PGW and GGSN act as the anchor point for data communication and they route user plane data through the GTP-U tunnels (PMIP may also be used in S5/S8 interfaces) within the core network. 3GPP TS 23.401 defines this EPC architecture. A GTP-U tunnel provides common QoS treatment to the IP flows transported through them. Packet filters decide the flows that are to be transported through a specified GTP-U tunnel.

The purpose of SMS is to provide the means to transfer short text messages between a MS/UE and a SME (Short Message Entity) via a SC (Service Centre), as described in 3GPP TS 23.040. SMS is mainly used to exchange short text messages between users. However SMS can also be used by some higher layer applications for short data communication. SMS can also provide a store and forward mechanism. SMS is routed differently than regular user plane data as and does not generally use the SGi/Gi interface path.

MMS is a service that is used to provide a rich set of content to subscribers in a multimedia messaging context. It provides a store-and-forward usage paradigm similar to SMS. However, MMS uses the packet domain user plane (SGi/Gi) to transport the multimedia messages. MMS can be considered an application level service running over the user plane. 3GPP TS 23.140 describes the MMS architecture. MMS supports the use of email addresses (RFC 2822) or MSISDN (E.164) or both to address the recipient of a multimedia message. MMS may also support the use of service provider specific addresses to address the recipient of an multimedia message.

As for NAS, there has been discussion within 3GPP SA2 about allowing the MTC-IWF to use the T5 interface to send small data messages to the SGSN/MME and then using a NAS or RRC message to send the data to the UE. This feature is not yet supported by 3GPP, but it is anticipated that in the future some such service may be supported.

Another existing mechanism for data transport in a 3GPP network is called device triggering. Device Triggering is the means by which a SCS sends information to a UE via the 3GPP network to trigger the UE to perform application specific actions that include initiating communication with the SCS. 3GPP TS 23.682 defines the device triggering mechanism supported by 3GPP networks. Device Triggering is required when an IP address for the UE is not available or reachable by the SCS/AS.

In order to determine if device triggering is necessary, the SCS/AS will have to track the validity of the device's IP address. It is possible that the network/PDN may re-allocate the IP address assigned to a M2M device to another UE if the device has been idle for too long. In some cases, the SCS/AS may try initial communication using the device's IP address known at the SCS/AS and may detect that the IP address is invalid after the communication fails (probably based on ICMP messages). This could be time-consuming for establishing a communication with a M2M device. Also, the existing device triggering approach requires the SCS/AS to determine if device triggering is needed before exchanging application data, and the SCS/AS will have to build a device triggering message and initiate the device triggering procedure.

SUMMARY

The present application discloses a new method and system for application data transfer between applications in an M2M or MTC communication network, such as, without limitation, the 3GPP MTC architecture.

As mentioned above, M2M/MTC communications have different characteristics than traditional communications involving humans. Some M2M/MTC applications may require immediate (low latency) data transfers while other M2M communications can tolerate delays on the order of days. While 3GPP has several methods available for transferring data and is developing approaches for sending small user data packets over the control plane, these existing methods do not account for the basic underlying communication requirements of the application that is sending the data. The core network nodes or application servers (i.e. an SCS) that send application data are not able to influence what data transport methods are selected. By introducing application-awareness into the EPC, the EPC may provide more application-aware services as well as more efficient transport services to applications than just the QoS and IP flow control.

Application awareness can also make triggering more efficient. The existing device triggering mechanism in 3GPP networks requires that the trigger be initiated by the SCS. The SCS is expected to determine the state of the UE and decide if a trigger is necessary. Similarly, the SCS has to indicate to the core network when to use small data transmissions. The SCS is expected to know the optimal data delivery method. But these decisions can be made more intelligently or efficiently by the core network with assistance from the SCS.

The existence of multiple different data transport mechanisms in 3GPP networks also make M2M/MTC application development more difficult. If a developer wants to try to take advantage of different transport mechanisms in different scenarios, the application developer must code for each of those different mechanisms and must also provide the code necessary to select the appropriate mechanism in a given situation.

To address these deficiencies in the existing art, the present application discloses a new service, referred to herein as an Application Data Delivery Service (ADDS) which facilitates application data transfer between applications that may reside in the device domain, e.g., M2M/MTC devices and gateways), and applications residing in the network domain, e.g., an AS or SCS. Also disclosed herein are new interfaces (i.e., reference points) between the ADDS and the 3GPP core network nodes to provide the new data delivery service.

In one embodiment, applications are each assigned a unique ADDS service specific identifier that identifies the application to the ADDS service. This identifier provides an abstraction over the various 3GPP layer identifiers and helps the ADDS service and end nodes hosting the applications to provide the ADDS specific functionality seamlessly. With this application identifier, applications do not need not be aware of the other transport layer-specific identities like IP addresses, FQDNs, External IDs, MSISDNs, or the like.

In one embodiment, the ADDS leverages existing 3GPP transport mechanisms, such as NAS, SMS, USSD, and User Plane, and it is configured to select a transport mechanism for delivering application data based on criteria, such as application data characteristics, application/end node characteristics and availability, subscription information, policies of the network, network conditions (such as congestion, node availability) and the like.

Other features provided by the ADDS include application mobility (the ability for an application to continue using the ADDS service even though the mode of accessing the network changes), store and forward capabilities, and others which will become evident hereinafter.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the Detailed Description below, given by way of example, in conjunction with the accompanying drawings wherein like numerals indicate like elements throughout. In the drawings.

DETAILED DESCRIPTION OF ILLUSTRATIVE EMBODIMENTS ADDS ARCHITECTURE

Figure 3:
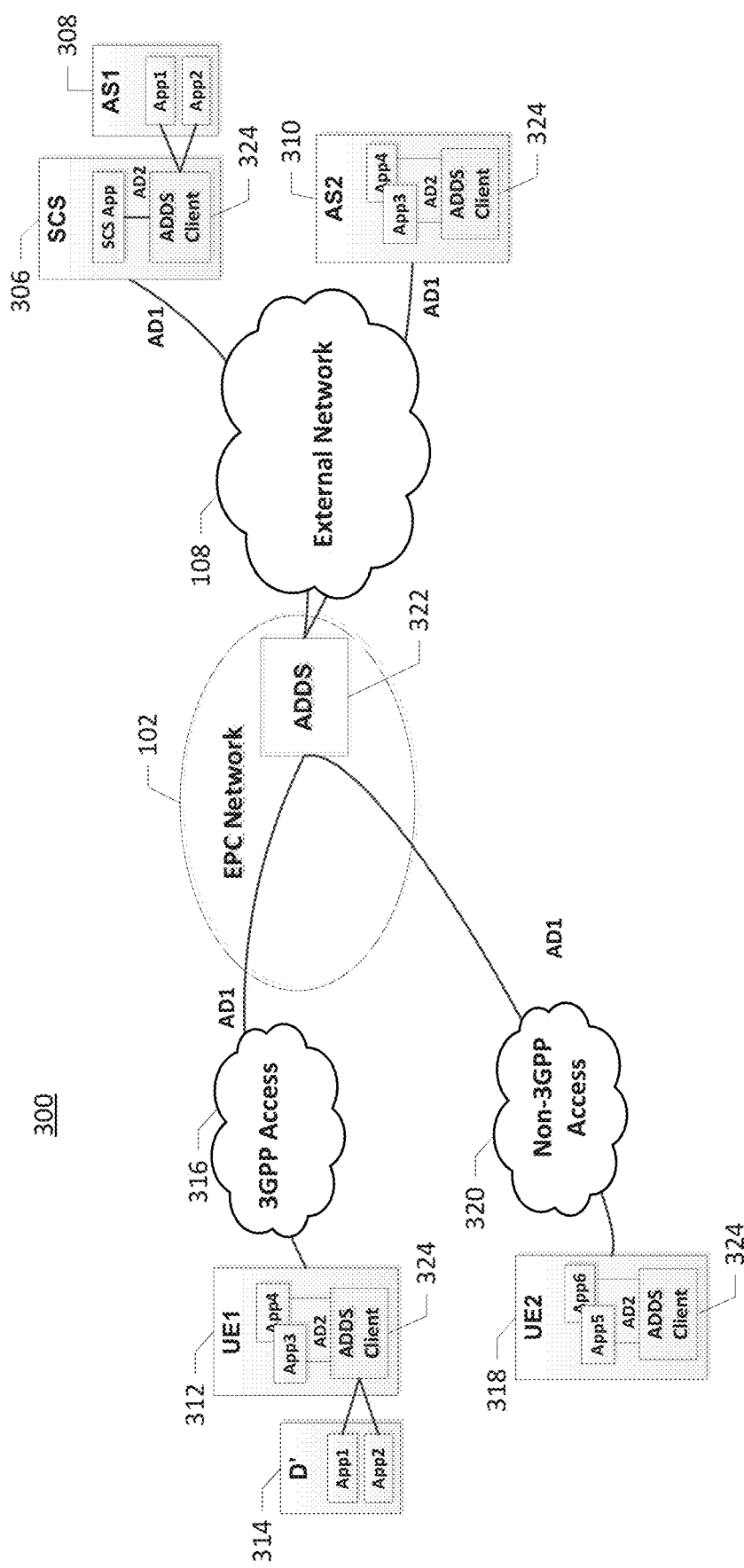
FIG. 3 is a block diagram presenting a high-level overview of the architecture of a new application data delivery service (ADDS), including ADD clients and an ADDS entity, in accordance with one embodiment thereof

FIG. 3 is a block diagram presenting a high-level overview of the architecture of a new application data delivery service (ADDS), in accordance with one embodiment thereof. In this embodiment, the ADDS is implemented by an ADDS entity 322 disposed in the 3GPP core network (i.e., EPC) 102 and a plurality of ADDS clients 324 hosted on various end nodes that may use the ADDS for data transfer in the system 300. End nodes that may use the ADDS include user equipment (UEs), such as UEs 312 and 318, as well as network entities, such as an SCS (Services Capability Server) 306 or an AS (Application Server) 308 or 310.

A UE may comprise any wireless device capable of communicating in a 3GPP or other wireless network, such as an M2M or MTC device or gateway, including for example, machines, sensors, appliances, or the like, a mobile station, a fixed or mobile subscriber unit, a pager, a personal digital assistant (PDA), a computer, a mobile phone or smart phone, or any other type of device capable of operating in a wired or wireless environment. An example architecture of a UE is described below in connection with FIG. 18. An SCS or AS (e.g., SCS 306 of AS 308, 310) may be implemented on a computing system or server, such as the example computing system or server described below in connection with FIG. 19.

In one embodiment, the ADDS client 324 is a logical entity (e.g., software) that may be stored in a memory of a UE, SCS, or AS and may execute on a processor of that device. However, in other embodiments, the ADDS client may be implemented entirely in hardware or in any combination of hardware and software. The ADDS client 324 on a UE interfaces with applications running on a UE (e.g., App3 and App4 running on UE 312, or App5 and App6 running on UE 318) or on another device (e.g., App1 and App2 running on device 314) that wish to use the ADDS for data transfer in the network. Similarly, an ADDS client 324 hosted on an SCS (e.g., SCS 306) may interface with application running on the SCS (e.g., the SCS App) or applications running on an AS that communicates with the SCS (e.g., App1 and App2 running on AS 308). As further shown, an ADDS client 324 may be hosted on an AS and interface directly with the applications running on that AS (e.g., App3 and App4 running on AS 310). As further shown, ADDS clients 324 running on a UE can use either the 3GPP access network 316 or a non-3GPP access network 320 to communicate with the ADDS entity 322 in the EPC 102.

The ADDS entity 322 may also be implemented as a logical entity (e.g., software) executing either on a stand-alone node or server in the EPC 102 or as part of an existing node or server. Various embodiments in this regard are discussed more fully below. Like an SCS, AS, or any node or entity within the EPC 102, the ADDS entity 322 may also be implemented on a computer system or server such as the one described below in connection with FIG. 19.

In general, the ADDS acts as a gateway for application message exchange and enables the optimized transfer of data through the network. The ADDS allows the application layer to provide characteristics of applications and characteristics of the data being transferred, which characteristics may then be used by the ADDS entity in selecting the optimal transport mechanism (e.g., SMS, NAS, USSD, User Plane etc.) for delivering the data. The ADDS client 324 residing in an end node registers the applications it services with the ADDS entity 322 in the network and passes characteristics of those applications and the end node device to the ADDS entity 322. The ADDS client 324 keeps track of the applications, their status and characteristics. As illustrated in FIG. 3, the applications and the ADDS client 324 need not co-exist on the same physical device. For example, in an M2M network, an application may be a device application (DA) running on an M2M device (e.g., device 314 in FIG.

3), and the ADDS client 324 may reside on the M2M gateway (e.g., UE 312 in FIG. 3) that services that M2M device. In the downlink direction, the ADDS client 324 is responsible for transferring received messages to the correct application. In the uplink direction, the ADDS client 324 will choose an appropriate transport mechanism (SMS, NAS, use plane etc.) to send a message based on policies/instructions provided by the network ADDS entity 322.

The ADDS entity 322 tracks and maintains the association of an application with a given ADDS client 324 and routes messages for an application to the appropriate ADDS client 324. As mentioned, the ADDS client 324 the routes the message to the appropriate application. In one embodiment, the ADDS assigns a unique identifier, referred to herein as an application ID, to each application to uniquely identify that application within the ADDS.

Thus, ADDS is a means of data communication and can be used by any application/entity in the service layer (like an SCS in an M2M network) or in the application layer (like a NA in an M2M network or an AS) for its communication needs. As long as the application ID is known, any entity can send a message to that application, so long as the sending application/end node is authorized to do so and is interfaced to an ADDS client 324. While the ADDS may be described herein primarily in the context of M2M/MTC communications, it is understood that the ADDS is not limited to such communications but may also be used by non-M2M applications and nodes. For example, the ADDS may be used for communication between applications running on UEs and applications on external application servers on the network side, applications running on one UE to applications running on other UEs, and applications on servers/nodes on the network side to other applications on other servers/nodes.

As mentioned above, the ADDS entity is logical and can be implemented as a separate entity or it can be merged as a functional part of other network nodes, such as the PGW or MTC-IWF in the 3GPP MTC architecture. Various alternatives are described below. Because the ADDS can transfer messages over the 3GPP control plane or user plane paths, it may communicate with both the control plane nodes (like the MME, HSS, etc.) and user plane nodes (like the PGW), and hence the various alternatives described below illustrate how the ADDS entity 322 may be integrated in different ways in both the user plane and control plane.

Figure 1:
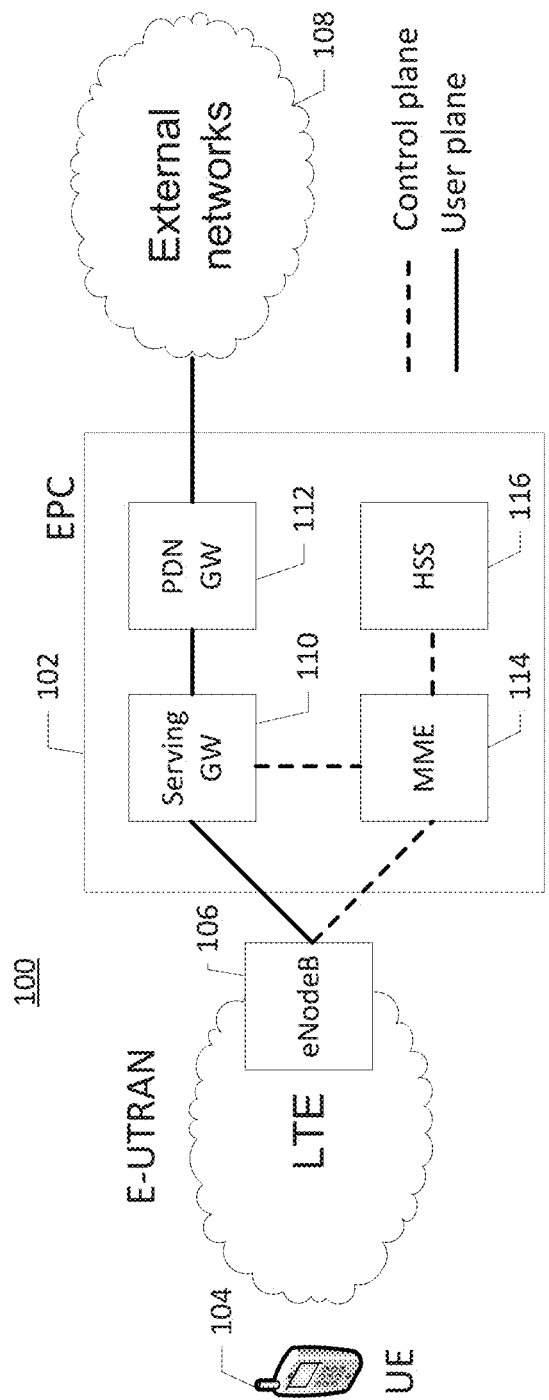
FIG. 1 is a basic architecture diagram of the 3GPP core network architecture.
Figure 4A:
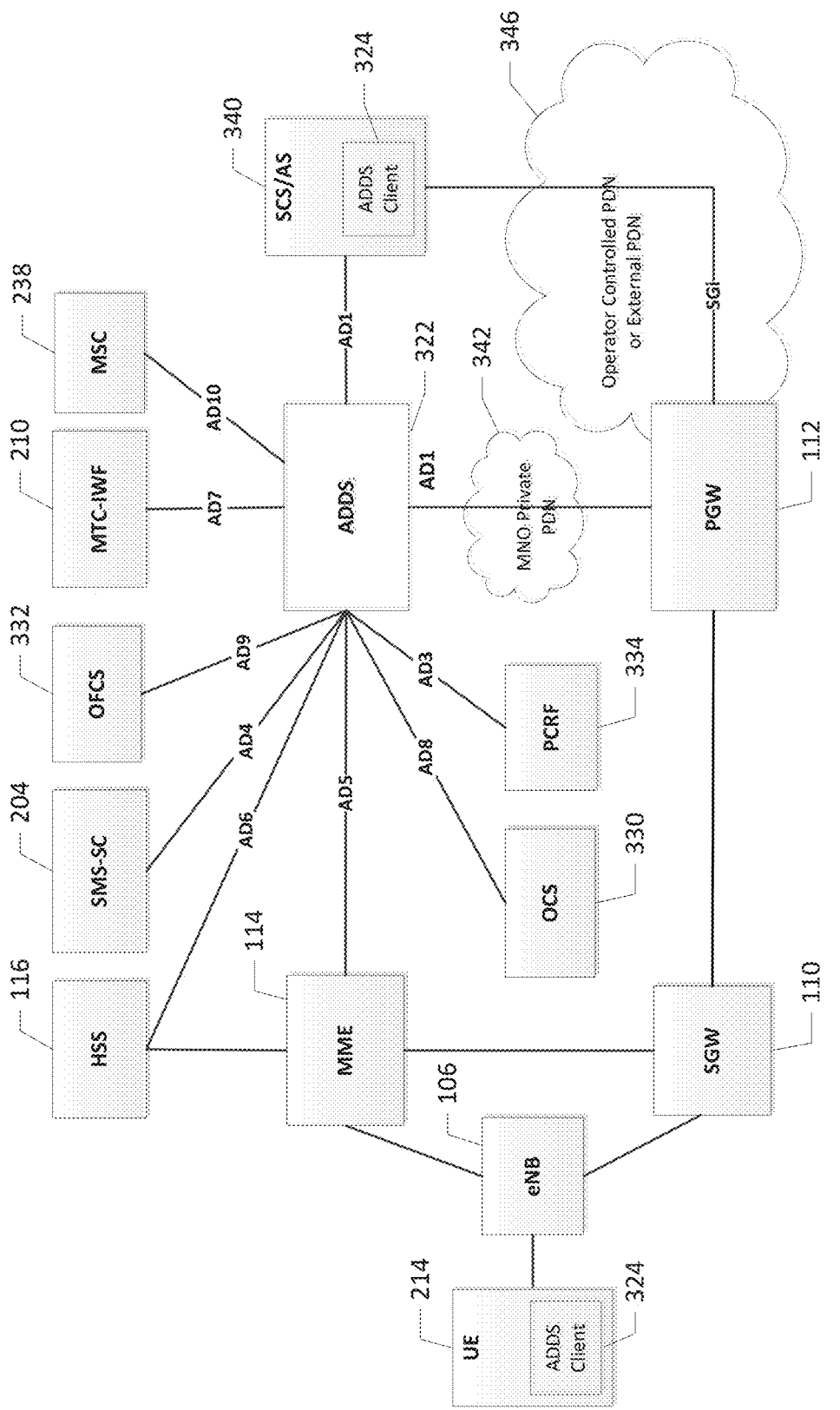
FIG. 4A is a block diagram illustrating one embodiment of the ADDS in which the ADDS entity is implemented as a separate logical node within the core network.

FIG. 4A is a block diagram illustrating one embodiment of the ADDS in which the ADDS entity 322 is implemented as a separate logical node within the core network. Most of the core network nodes illustrated in FIG. 4A, including the eNodeB 106, SGW 110, PGW 112, MME 114, HSS 116, SMS-SC 204, MTC-IWF 210, and MSC 238, are described above and also illustrated in FIGS. 1 and/or 2. FIG. 4A introduces three additional core network nodes, namely, the online charging system (OCS) 330, offline charging system (OFCS) 332, and policy and charging rules function (PCRF) 334.

The OCS 330, OFCS 332, and PCRF 334 are logical entities/functions within the core network responsible for charging and billing in the network. They handle generation and collection of charging information that is then forwarded to appropriate charging and billing systems. Online charging refers to the mechanism whereby charging information can affect, in real-time, the service rendered. Offline charging refers to the mechanism whereby charging information does not affect, in real-time, the service rendered. The OCS 330 is the entity that performs real-time credit control for online charging. Its functionality includes transaction handling, rating, online correlation and management of subscriber accounts/balances. The OFCS 332 handles online charging functions, whereas the OFCS 332 is the entity that collects and processes offline charging information prior to delivery to the billing system. The PCRF 334 interfaces with the PGW 112 and makes charging enforcement decisions on its behalf. It can act as a policy decision point for the network operator. For example, service providers can use the PCRF 334 to charge subscribers based on their volume of usage of high-bandwidth applications, charge extra for QoS guarantees, limit application usage while a user is roaming, or lower the bandwidth of wireless subscribers using heavy-bandwidth applications during peak usage times.

In the embodiment illustrated in FIG. 4A, where the ADDS entity 322 is a standalone entity within the core network, the ADDS entity 322 interfaces with the other core network entities, as well as external entities such as an SCS or AS 340, via newly defined reference points—AD1, AD2, AD3, AD4, AD5, AD6, AD7, ADB, AD9, AD10, and AD11. In the present embodiment, these reference points are dedicated interfaces for enabling ADDS functionality in the network. Each reference point is described in greater detail below.

In the embodiment illustrated in FIG. 4A, any external nodes, such as an SCS or AS 340, will connect to the ADDS entity 322 in order to use the ADDS service. The ADDS entity 322 will send and receive messages to the UEs (e.g., UE 338). A separate private packet data network (PDN) 342 may be used by a mobile network operator (MNO) for communications between the ADDS entity 322 and the PGW 112.

While a single ADDS entity 322 is illustrated in FIG. 4A, in other embodiments, there can be multiple separately addressable ADDS entities (not shown). This can allow the operator to enable the ADDS functionality on a per packet data network basis or to a subset of subscribers.

FIGS. 4B-4E illustrate other embodiments in which the ADDS entity 322 is integrated with other core network nodes or placed as part of the service domain as an external entity to the EPC. In these other alternative embodiments, the new reference points that are defined herein (AD1 to AD11) could be merged or mapped to existing reference points. The respective diagrams in FIGS. 4B-4E show which existing reference points could be merged or mapped to the new reference points defined herein for the ADDS service.

Figure 4B:
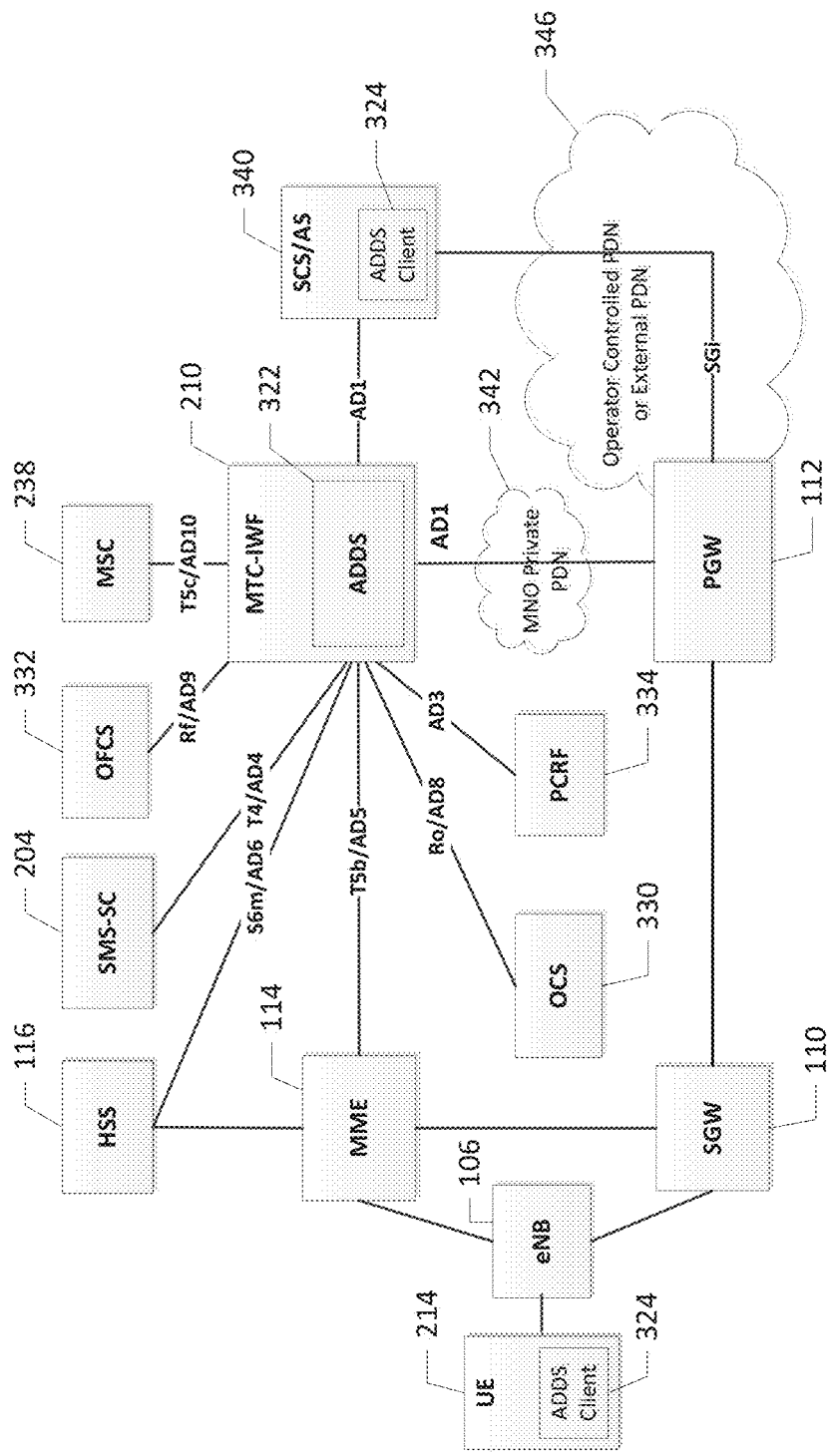
FIG. 4B illustrates an embodiment in which the ADDS entity is collocated with a 3GPP MTC-IWF.

FIG. 4B illustrates an embodiment in which the ADDS entity 322 is collocated with the MTC-IWF 110. That is, the logical functions of the ADDS entity 322 are implemented on the same computer system or server that implements the logical functions of the MTC-IWF 110. The AD1 reference point (protocol and procedures) that the ADDS entity 322 uses to interface to the ADDS client 324 in the SCS or AS 340 may map to or be integrated with the 3GPP Tsp interface, and the information elements (IEs) of the AD1 reference point can in that embodiment be transferred as Attribute-Value Pairs (AVPs) using the Diameter protocol—which is the protocol used to transmit messages across the Tsp and other existing 3GPP reference points. This embodiment can be advantageous as the interfaces that MTC-IWF 210 already has with other nodes like HSS 116, SCS or AS 340, and others, can be enhanced to support the ADDS functionality. For example, the AD6 interface may map to the 3GPP S6m interface, the AD5 interface may map to the 3GPP T5 interface, and the AD4 interface may map to the 3GPP T4 interface.

Figure 4C:
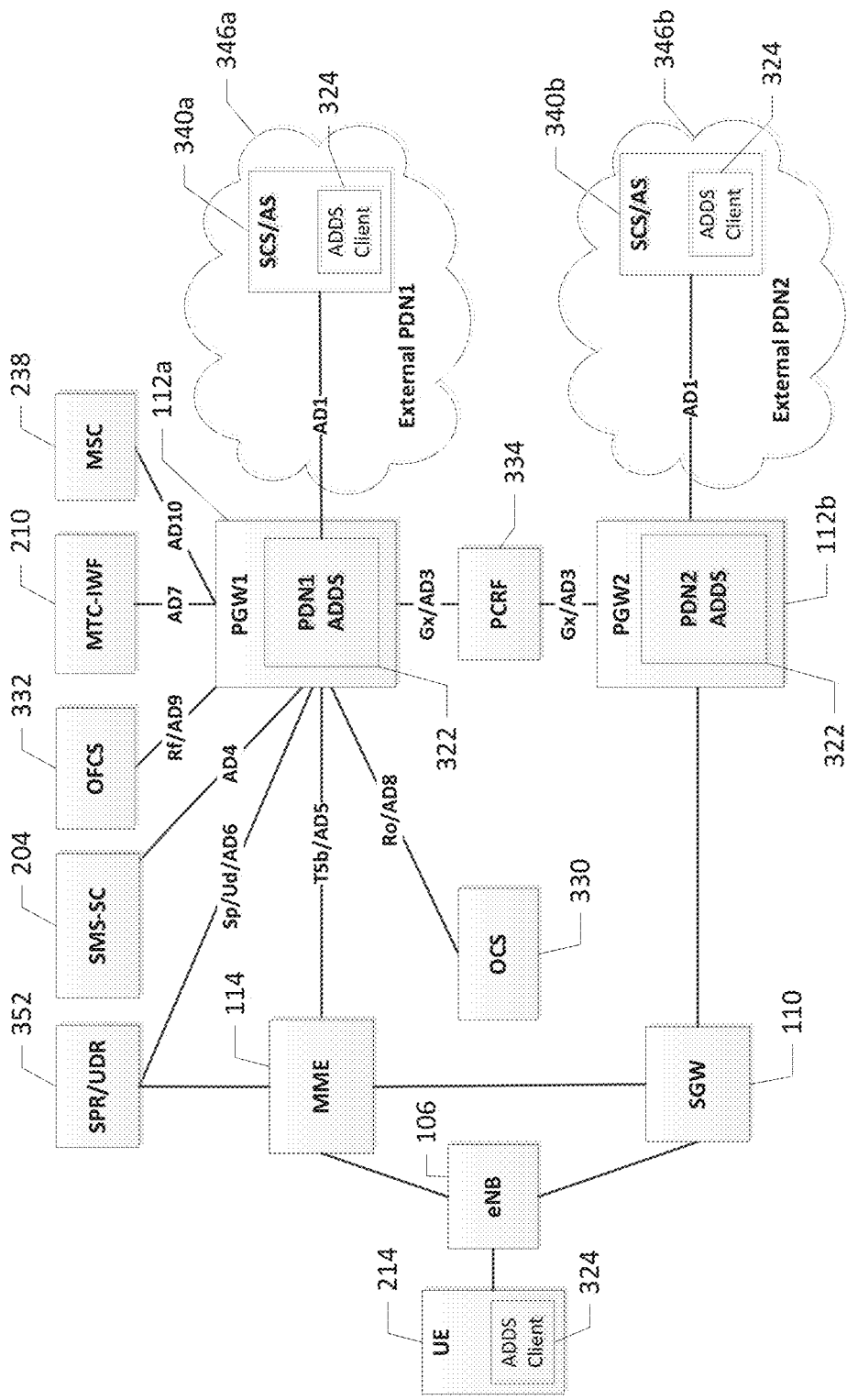
FIG. 4C illustrates an embodiment in which the ADDS entity is integrated as part of a 3GPP PGW.

FIG. 4C illustrates an embodiment in which the ADDS entity 322 is integrated as part of the PGW 112. This embodiment can be advantageous if the network operator wants to enable the ADDS functionality on a PDN basis to allow only the AS/SCS on a particular PDN and the UEs connecting to that particular PDN to use the ADDS service. For example, as shown, the network operator may allow one instance of the ADDS entity 322 to communicate with the PGW 112a that services external PDN 346a, and the operator may allow a second instance of the ADDS entity 322 to communicate with the PGW 112b that services external PDN 346b. Only the SCS/AS 340a on external network 346a can use the ADDS service provided by the ADDS entity on PGW 112a. Similarly, only the SCS/AS 340b can use the ADDS service provided by the ADDS entity on PGW 112b.

Note also in FIG. 4C that the HSS 116 is replaced with a logical entity 352, which may be a Subscription Profile Repository (SPR) or a User Data Repository (UDR). The SPR 352 is a 3GPP logical entity that contains all subscriber/subscription related information needed for subscription-based policies and bearer level charging rules by the PCRF 334. The UDR is a newer concept that was recently introduced in the 3GPP architecture. Today, subscriber data can reside in several different entities. The HSS is one of the most well-known entities where subscriber data is stored, but subscriber data can also be stored in places such as the SPR and UDR. The idea behind the UDR is that all subscriber information gets stored in one spot (the UDR). The UDR will present a single interface (Ud) that can be used for accessing subscriber data. In this embodiment, the existing interfaces of the PGWs with PCRF 334 (Gx), Subscription Profile Repository (SPR) 352 (Sp) and UDR (Ud) may be enhanced to provide ADDS functionality. The existing interfaces of the PGWs with OFCS 332 and OCS 330 can also be enhanced to support ADDS. Also, in this embodiment, a separate private PDN may not necessary.

Figure 4D:
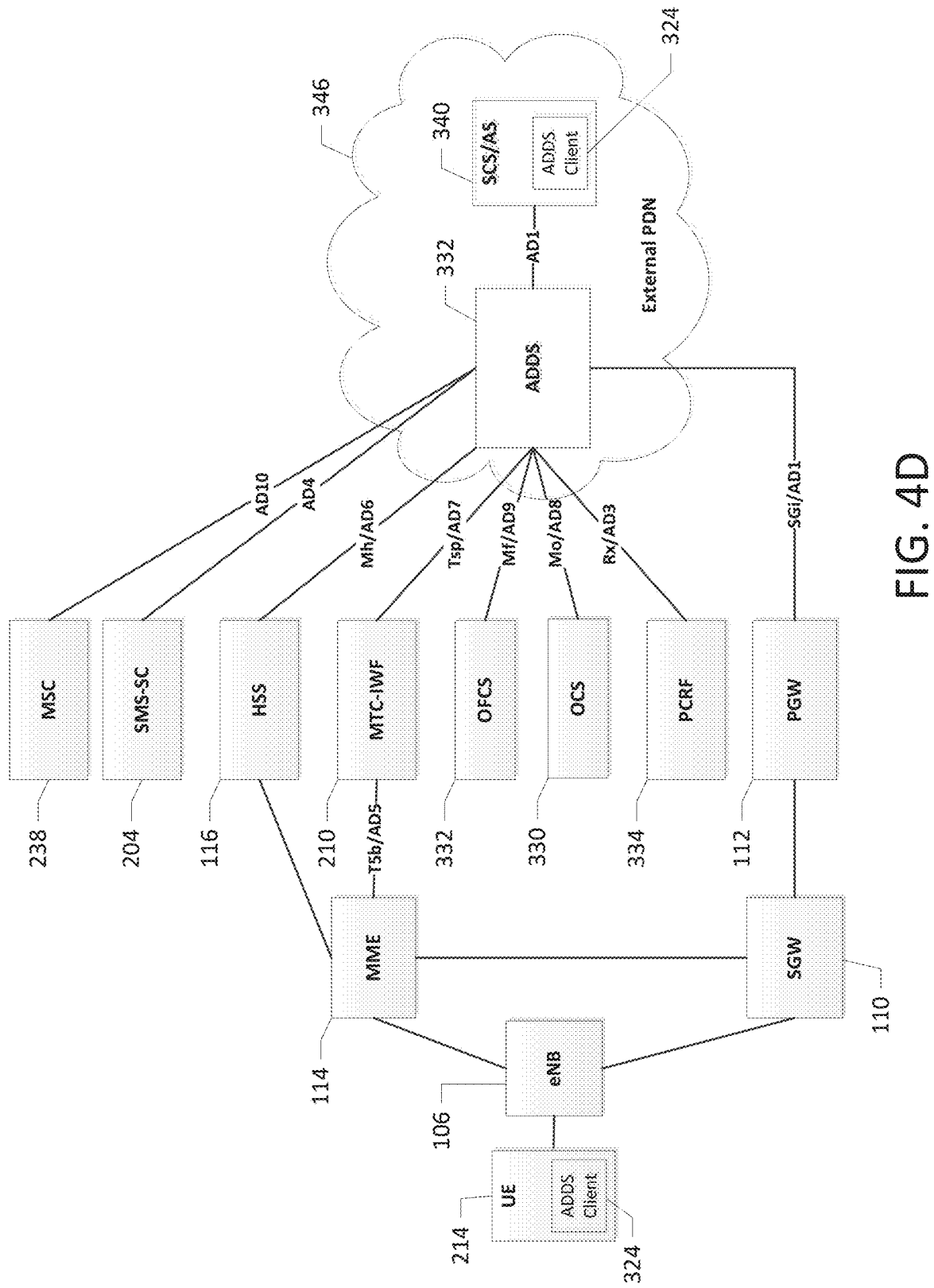
FIG. 4D illustrates another embodiment in which the ADDS entity is part of the service domain and may be an external entity to the 3GPP network operator.

FIG. 4D illustrates another embodiment in which the ADDS entity 322 is part of the service domain and may be an external entity to the 3GPP network operator. In FIG. 4D, the ADDS entity 322 is a separate entity within the service domain, but it could be implemented as part of an SCS. The ADDS entity 322 in this embodiment can interact with the core network using the existing 3GPP Tsp, Mh, Mo, Mf, Rx and SGi/Gi interfaces. The Mh and Tsp interfaces may be used for device configuration, monitoring and reporting, receiving subscription information, device triggering etc. (similar to AD4). The Rx interface may be used to provide and receive policy information (similar to AD3).

Figure 4E:
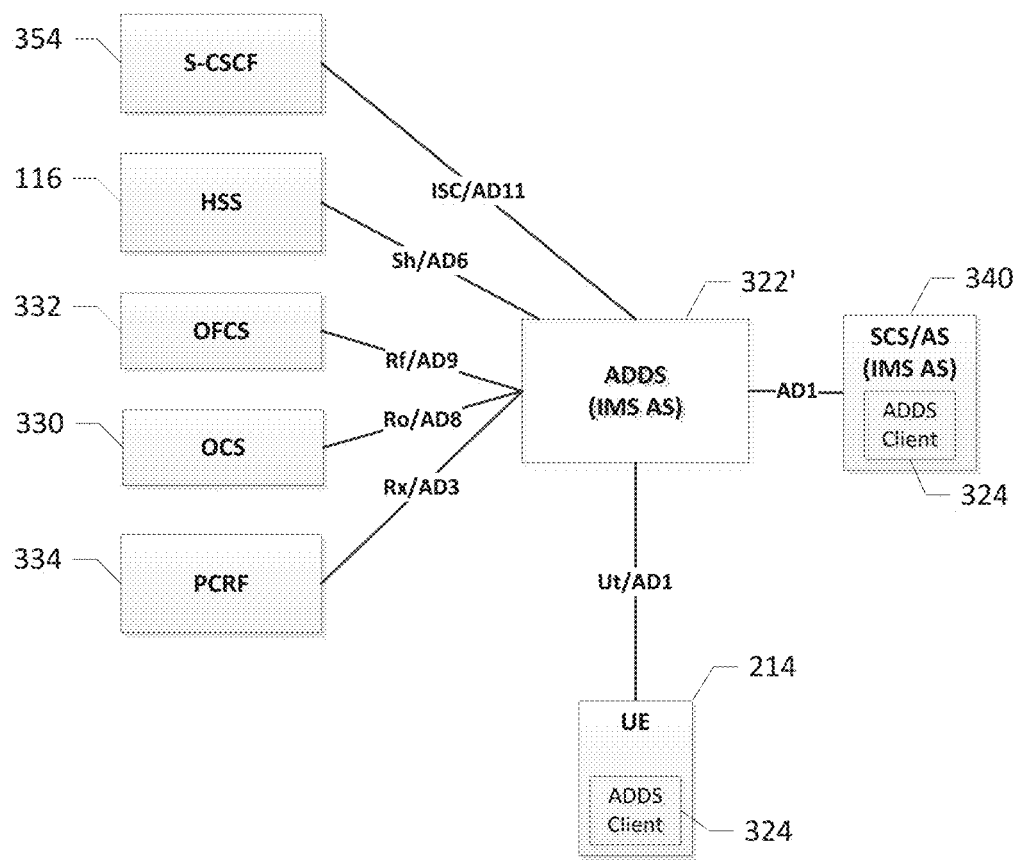
FIG. 4E illustrates yet another embodiment, in which the ADDS entity is implemented as a 3GPP IP Multimedia Subsystem (IMS) application server (AS).

FIG. 4E illustrates yet another embodiment, in which the ADDS entity is implemented as a 3GPP IP Multimedia Subsystem (IMS) application server (AS). In this embodiment, the AS 322's connections to the S-CSCF 354, HSS 116, OFCS 332, OCS 330, and PCRF 334 may be used to deploy the AD11, AD6, AD9, AD8, and AD3 reference points, respectively. The S-CSCF (Serving Call Session Control Function) is a logical entity in the 3GPP IMS network architecture that serves as the central node of the signaling plane. It is a Session Initiation Protocol (SIP) server, but performs session control too. It uses the Cx and Dx interfaces of the Diameter protocol to interface to the HSS to download user profiles and upload user-to-S-CSCF associations. All necessary subscriber profile information is loaded from the HSS.

In the embodiment of FIG. 4E, the HTTP based Ut reference point between a UE 214 and an IMS AS 322' may be used to carry data plane communication for the AD1 reference point of the ADDS entity within the IMS AS 322'. The ISC/AD11 reference point may be used by the IMS AS 322' to send messages to an ADDS client 324 via SIP messaging.

Adds Reference Points

As illustrated in FIGS. 3 and 4A-E, the ADDS service comprises the definition of new reference points (i.e., interfaces) AD1-AD11. The terms reference point and interface are used synonymously herein. Each reference point/interface is described further below.

AD1—The AD1 reference point resides between an ADDS client 324 on an end node and the ADDS entity 322 in the EPC. The ADDS control and data messages are transferred over this reference point. The ADDS messages on this reference point may be transported over the 3GPP networks control plane or user plane. This reference point may be used to, among others: (1) register/deregister applications to the ADDS entity; (2) transport application payloads; (3) subscribe for application related events; and (4) update end node capabilities, status information, schedule, and communication requirements.

AD2—The AD2 reference point resides between applications on and end node and the ADDS client 324 on that end node. This interface enables the applications to utilize ADDS functionality. For example, this reference point may be used by applications to: (1) register to the ADDS entity; (2) provision application characteristics; and (3) send and receive application data to/from the ADDS client 324.

AD3—The AD3 reference point resides between the ADDS entity 322 and the PCRF 334 in the EPC. This reference point may be used by the ADDS entity 322 to: (1) request policies for an end node or an application from the PCRF; (2) provide application and communication session characteristics to the PCRF; and (3) receive information related to charging characteristics. In one embodiment, the AD3 interface may be based on the 3GPP Rx reference point if the ADDS entity 322 is placed outside of EPC as shown, for example, in the embodiment of FIG. 4D. Or it could be based on the 3GPP Gx interface if the ADDS entity 322 is integrated with PGW 112, as shown in the embodiment of FIG. 4C.

AD4—The AD4 reference point resides between the ADDS entity 322 and the 3GPP SMS-SC 204. This reference point may be used by the ADDS entity 322 to communicate with the ADDS client 324 on a UE (e.g., UE 214) using the SMS transport mechanism/path in the EPC. The functionality of this interface is similar to the AD1 interface described above, but the underlying transport mechanisms implemented may be SMS instead of the SGi/Gi user plane path. The AD4 interface may, in one embodiment, be based on the 3GPP T4 interface.

AD5—The AD5 reference point resides between the ADDS entity 322 and the MME 114. This reference point may be used by the ADDS entity 322 to communicate with the ADDS client 324 on a UE 214 over the NAS or RRC transport mechanism. The functionality of this interface is similar to the AD1 interface described above, but the underlying transport protocol will be the NAS or RRC control plane instead of the SGi/Gi user plane path. In one embodiment, the ADS interface may be based on the T5b interface.

AD6—The AD6 reference point resides between the ADDS entity 322 and the HSS 116. The same reference point may also be used if an SPR or UDR 352 is used in the core network instead of HSS 116, as shown for example in the embodiment of FIG. 4C. This reference point may be used by the ADDS entity 322 to: (1) request subscription information of the end nodes and UEs; (2) receive notifications about changes in subscription information for a user; (3) provision device monitoring information and device characteristics; (4) receive updates on device status and capabilities; (5) provision the ADDS information and capabilities to allow the HSS/SPR/UDR to provide this information to the MMEs during the ADDS advertisement procedure described hereinafter. In one embodiment, the AD6 may be mapped to the 3GPP S6m of Mh interfaces if an HSS 116 is used in the core network. Alternatively, the AD6 interface may be mapped to the 3GPP Ud interface, if a UDR is used in the core network, or it may be mapped to the Sp interface if a SPR is used (as shown in FIG. 4C). In another embodiment, the ADDS entity 322 may act as an Application Front End as defined in 3GPP TS 23.335 and have the Ud interface with the UDR to achieve the uses above.

AD7—The AD7 reference point resides between the ADDS entity 322 and the MTC-IWF 210. This reference point enables the ADDS entity 322 to utilize the services provided by the MTC-IWF 210, like device triggering. In one embodiment, the AD7 interface may be based on the 3GPP Tsp interface.

AD8—The AD8 reference point resides between the ADDS entity 322 and the OCS 330. This reference point may be used by the ADDS entity 322 to communicate with the OCS to support online charging for the ADDS service. In one embodiment, the AD8 interface may be based on the 3GPP Ro interface.

AD9—The AD9 reference point resides between the ADDS entity 322 and the OFCS 332. This reference point may be used by the ADDS entity 322 to communicate with the OFCS 332 to support offline charging for the ADDS service. In one embodiment, the AD9 interface may be based on the Rf interface.

AD10—The AD10 reference point resides between the ADDS entity 322 and the MSC 238. This reference point can be used by the ADDS entity 322 to communicate with an ADDS client 322 on a UE (e.g., UE 214) using the Unstructured Supplementary Service Data (USSD) transport mechanism. The functionality of this interface is similar to the AD1 interface described above, but the underlying transport protocol will be USSD instead of the SGi/Gi user plane path. In one embodiment, the AD10 interface may be based on the 3GPP T5c interface.

AD11—The AD11 reference point resides between the ADDS 322 and the IMS S-CSCF 354, in the embodiment of FIG. 4E. This reference point may be used by the ADDS entity 322 to communicate with the ADDS client 322 on a UE (e.g., UE 214) via SIP messaging. The functionality of this interface is similar to the AD1 interface described above. In one embodiment, the AD11 interface may be based on the 3GPP ISC interface.

Adds Functionality

This section describes the features and functionalities that the ADDS service provides for application communication.

Application Identifiers

Figure 2:
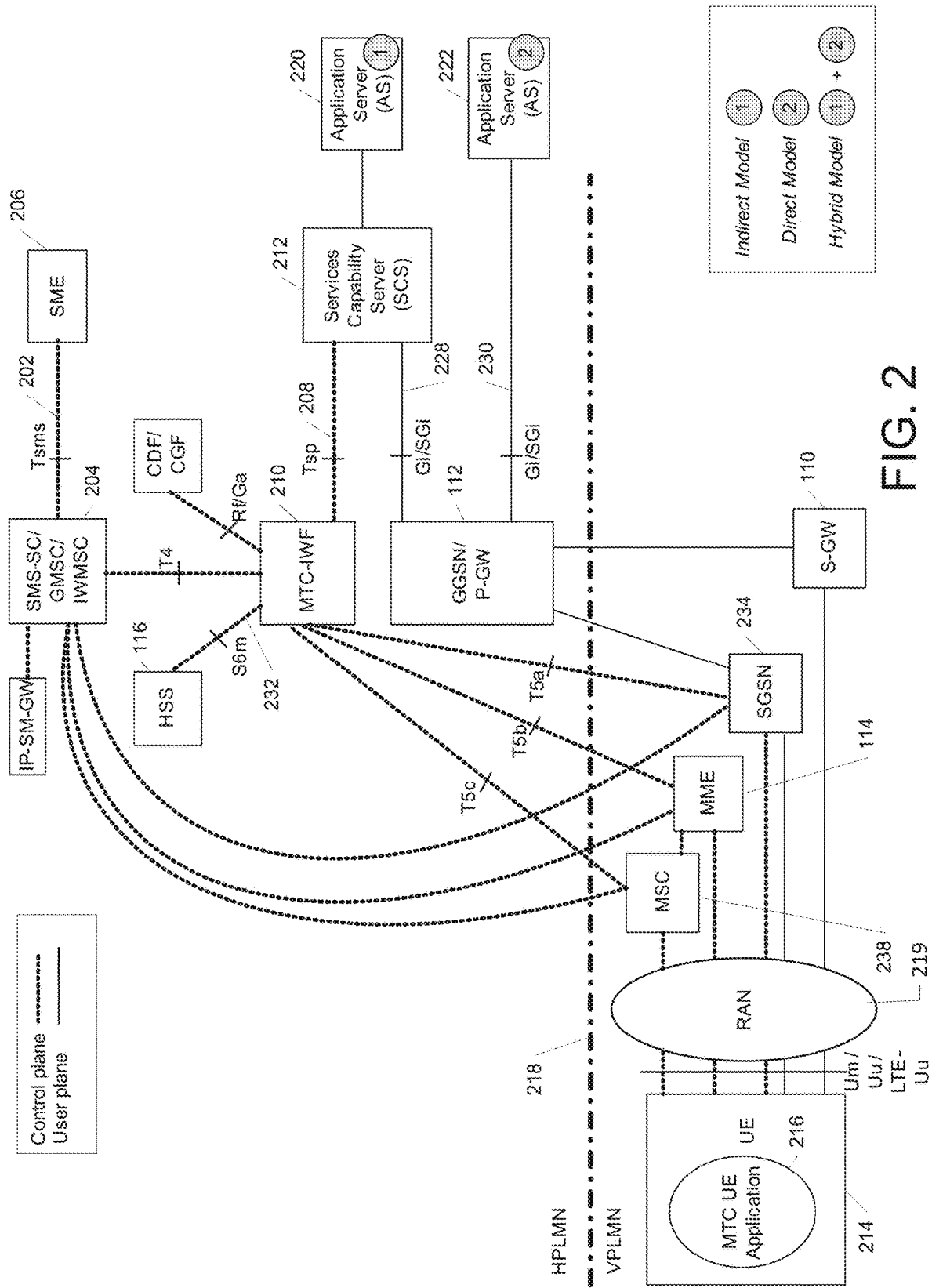
FIG. 2 is a block diagram of the 3GPP Machine Type Communication (MTC) architecture.

In one embodiment of the ADDS service, an application (e.g., MTC application 216 running on UE 216 in FIG. 2, or App1-App6 running on the UEs 312/318, Device 314, SCS 306, AS 308, or AS 310 in FIG. 3) that wishes to use the ADDS service is assigned a unique application identifier (also sometimes referred to herein as an "application ID"). An application on an end node can communicate with other applications by sending ADDS messages that are addressed to the application identifier of the receiving application.

The application identifier is used to uniquely identify an application globally. The ADDS entity 322 in the network assigns the application identifiers, maintains the list of applications that reside in an end node and maintains the mapping of application identifiers with the end node context which has the addressing information of the end node, such as an end node IMSI, IP Address, MSISDN, or the like.

When a message is sent to an application identifier, the ADDS entity 322 finds the end node on which the application resides from a mapping table that it stored and retrieves the addressing information for the end node, such as the end node IMSI, IP Address, MSISDN, or the like. The end node address is used to send the ADDS message to the correct end node and the application identifier is used by the ADDS client 324 in the end node to deliver the messages to the correct destination application.

Thus, the application ID is used for identification purposes and the end node address is used for the purpose of routing the ADDS message via one of the existing transport mechanisms in the network. With the ADDS service, an application need not be aware of the address of an end node on which another application it wishes to communicate with resides. The sending application may simply use the application ID of that other application to send/receive messages and let the ADDS entity 322 in the network maintain the end node addressing information.

In one embodiment, the application identifier is an alpha-numeric value that is allocated by the network ADDS entity 322 as part of an ADDS Application Registration procedure described hereinafter. In some embodiments, it may be globally unique. Additionally, in one embodiment, a part of the application ID may be prefixed with a common group ID for applications that are of the same type or belong to a group. The common group ID can be used for group communication by enabling ADDS messages be addressed to the group ID. In this embodiment, the ADDS entity may deliver the message to all the applications that have the group ID as a prefix in their application ID.

In an embodiment, different instances of the same application in the same end node may be assigned with different application identifiers. Additionally, the application identifier may be associated with an application and just temporarily linked to the end node on which the application resides presently, as long as the application resides on that end node. This functionality supports application mobility as described below.

Reserved Application Identifiers

In another embodiment, a range of application identifiers may be considered to be reserved. In that embodiment, an ADDS entity 322 may not allocate an application identifier within this range. A reserved application identifier can be used by applications without registering the application with the ADDS entity 322. These application identifiers may be unique only within the ADDS client and may not be globally unique. The reserved application ID alone cannot be used as the destination application ID for sending ADDS messages. The sending entity should also provide the end node ADDS client 324 addressing details along with the reserved application identifier.

Some applications can make use of these reserved applications IDs and can act as the default ADDS message handling application for the end node. The reserved app IDs may be designated with some purpose, such as application discovery. For example, when an M2M device is booted up, the M2M application running on that device may not be aware of the SCS application ID to which it needs to communicate, but the SCS Fully Qualified Domain Name (FQDN) may be available. The M2M device application can send an ADDS message to a reserved application on the SCS that would receive the message and send the details of the applications on the SCS to the requesting M2M application. In another example, when a M2M device application registers to the ADDS entity 322 and gets an application ID and wants to communicate this application ID to the SCS, then it may send its details as an ADDS message to a reserved application on the SCS that is marked for learning the ADDS application IDs of M2M device applications.

Application Mobility

In the present embodiment, the ADDS entity 322 may allow an application to move or change its mode of accessing the network (that provides the ADDS service) and still retain its communication using the ADDS service. As used herein, application mobility refers to the change of the way in which an application connects to the network.

For example the end node in which an application is running may use a different access technology, such as Wi-Fi or WiMAX, to connect with the EPC or use a different 3GPP subscription (e.g., a different 3GPP modem or a different SIM card). In case of an M2M application, the M2M device that hosts the application can move to another area that is served by a different M2M GW that connects over a 3GPP network to the M2M Server.

In an embodiment, the ADDS service may make application mobility possible by allowing applications to retain their application IDs after application mobility. When the ADDS entity 322 allocates an application ID, it may also provide a security token. During application mobility when there is a change in the ADDS client 324 that the application uses to connect with the core network, an application re-registration may be performed to update the addressing information of the new ADDS client 324 that is to be used for communications with the application. The application may request the re-allocation of the previous application identifier and provide the security token. The ADDS entity 322 may then verify the security token, re-allocate the same application ID, and update its mapping table with the details of the new ADDS client/end node.

Store and Forward

In another embodiment, the ADDS service may provide store and forward functionality. Store and Forward functionality provides a mechanism wherein the messages intended to a destination application are stored in the ADDS entity 322 and then relayed at a later time. The ADDS entity decision to store the message may depend on the following criteria:
(1) Application Characteristics—Whether the application is tolerant for delays in its communication.
(3) Application Availability—The destination application may not be available to receive ADDS messages. It may not be running or it could have de-registered temporarily from ADDS.
(3) Application Notification—An application could notify the ADDS entity 322 to store the incoming ADDS messages and send only a message indication. As a further feature, the ADDS entity 322 may enable the application to specify that message over a certain size should be stored for later deliver, while messages under the size limit would be transmitted promptly.
(4) End node Characteristics—An end node may be available for data communication only for a specified time period in a day. For example, a UE may have subscribed to some M2M features that would make the UE available for communication only for some duration in a day.
(5) End Node Reachability—An end node may not be available/reachable for data communication. It could have detached from the network or it may not be in the radio coverage area.
(6) Network Conditions—The network nodes may be under overload state or a network node may be temporarily down or under maintenance.
(7) Subscription Information—The subscription information from the HSS 116/UDR 352.
(8) Policy Rules—Policy and charging rules from PCRF 334.

Path Selection

One of the prominent functions of the ADDS clients 324 and ADDS entity 322 is their transport mechanism/path selection function. This feature leverages the various existing transport mechanisms available to 3GPP networks for transporting ADDS messages. For example, in one embodiment, the ADDS messages between an ADDS client and the network may be transported using a selected one of the following existing 3GPP transport mechanisms: Short Message Service (SMS), Non-Access Stratum (NAS), Unstructured Supplementary Service Data (USSD), or the user plane. Methods for transporting ADDS messages over the above transport methods and the protocol stacks used are described more fully below.

In other embodiments, the ADDS service may also employ broadcasting and multicasting mechanisms that are available in 3GPP networks for group communication. For example, if an ADDS message is to be transmitted to multiple different end nodes then a selected one of the following mechanisms may be employed: Cell Broadcast Service (CBS); Multimedia Broadcast Multicast Service (MBMS); Evolved Multimedia Broadcast Multicast Service (eMBMS), IP Multicasting, and the like.

In one embodiment, the following criteria may be used by an ADDS client 324 or ADDS entity 322 in selecting the transport mechanism/path to be used for transporting a given ADDS message:
(1) Message Length—Message length may be an important factor in deciding on the transport mechanism/path to select. For example, if the message size is small, the SMS path may be used, and alternatively, the user plane path could be used if the message size is very big.
(2) Message Characteristics and Application Characteristics—The source application (i.e., the application requesting a message be sent) may provide characteristics of the application as well as characteristics of the message, and these characteristics may be considered by the ADDS client 324 or ADDS entity 322 in path selection. For example, application or message characteristics such as message rate, quality-of-service (QoS) requirements, importance of the message (e.g., high importance or low importance), available identifiers, and the like may be used by an ADDS client 324 or ADDS entity 322 in deciding the appropriate transport mechanism/path to be used.

(4) End Node capabilities and availability—An end node may be capable to support only some transport paths. For example, an LTE UE may not support the USSD transport mechanism. and a SCS may support only IP path (i.e., user plane) communication. These restrictions would be taken into account in selecting a transport mechanism/path for a given ADDS message.

(5) Core network node availability and network conditions—The ADDS entity 322 in the network may select a transport mechanism/path based on the availability of the 3GPP core network nodes (such as the MME 114, MSC 238, PGW 112, and the like). In some embodiments, the ADDS entity 322 may inform the ADDS clients 324 at one or more end nodes not to use certain transport mechanisms if it identifies that the core network entities/interfaces providing those transport mechanisms are currently overloaded.

(6) Subscription information—The subscription information from HSS 116/UDR 352 may restrict the ADDS service to use of a limited number of available transport mechanisms/paths.

(7) Policy Information—Lastly, the policy and charging information from the Policy and. Charging Control (PCC) function of the core network (which includes the OCS 330, OFCS 332, and PCRF 334) may also be used to dynamically control the path that is to be selected for ADDS message transfer.

While one or more of these seven criteria for transport mechanism/path selection may be employed in various embodiments, it is understood that the ADDS service is not limited to use of only those criteria. Rather, any criteria that may aid in selection of an appropriate path may be employed. In many embodiments, the network operator will decide path selection policies based on the topology of the network and the current network conditions.

In one example, there may be an application whose "Message Characteristics and Application Characteristics" indicates that the application can tolerate high delays, has a low message rate, and the message is of low importance and a relatively short "Message Length." The network operator may configure the ADDS transport mechanism/path selection policy such that the SMS transport mechanism will selected for this application, since SMS is well suited for small data packets that does not require low latency. Alternatively, the network operator may decide that it does not want to generate extra SMS traffic and may configure the policy such that some control plane transport mechanism, such as NAS or RRC, is selected for this application, since again, the data packets are small and infrequent. In yet another alternative, the network operator may indicate to the ADDS clients 324 and/or ADDS entity 322 that the control plane transport mechanisms, such as SMS, NAS, or RRC, are particularly congested at the moment, thus resulting in the selection of the user plane as the transport mechanism to use for this message.

In another example, there may be an application whose "Message Characteristics and Application Characteristics" indicate that the application data path is not tolerable to high delays, has a low message rate, and is of low importance and whose "Message Length" is relatively low. The network operator may configure the ADDS transport mechanism/path selection policy such that SMS is not selected for this application, because SMS messaging does not guarantee a low delivery latency.

As yet another example, there may be an application whose "Message Characteristics and Application Characteristics" indicate that the application data path is tolerable to high delays, has a low message rate, and is of low importance and whose "Message Length" is relatively high. The network operator may configure the ADDS transport mechanism/path selection policy such that the control plane transport mechanisms, such as SMS, NSA, and RRC, are not chosen for this application, since the relatively large message size would generate lots of control plane traffic. Thus, the network operator's policy may dictate that the user plane be selected for this application.

Adds Client

As mentioned above, in one embodiment, the ADDS client 324 comprises a logical entity (e.g., software) that may be stored in a memory of a UE, SCS, or AS and may execute on a processor of that device. However, in other embodiments, the ADDS client 324 may be implemented entirely in hardware or in any combination of hardware and software. The ADDS client 324 interfaces with the ADDS functionality (e.g., ADDS entity 322) in the network to enable the applications on the end nodes to communicate with each other. Applications that require ADDS for their data communication may bind to an ADDS client 324 on an end node. In one embodiment, the ADDS client 324 provides the following functionalities:

(1) Registering applications with the network ADDS entity 322, obtaining application IDs, maintaining the mapping of applications IDs to the respective applications and maintaining application states related to the ADDS service.

(2) Transfer of application data as per the characteristics of the application communication. This includes selection of a transport mechanism/path (e.g., NAS, SMS, UDDS, or user plane) and time to transfer the data, and application data buffering.

(3) Abstract applications from the underlying data transport methods and other ADDS procedures.

(4) Encrypt application data if needed (5) Encode and decode ADDS protocol headers.

(6) Provide APIs to applications.

In the present embodiment, applications bind with an ADDS client 324 over the AD2 interface. It is possible that the application and the ADDS client are in different physical entities (e.g., App1 of device 314 is bound with ADDS client 324 on UE 312 in FIG. 3), or they can be integrated in the same physical device (e.g. App3 and App4 on UE 312 of FIG. 3).

Figure 5:
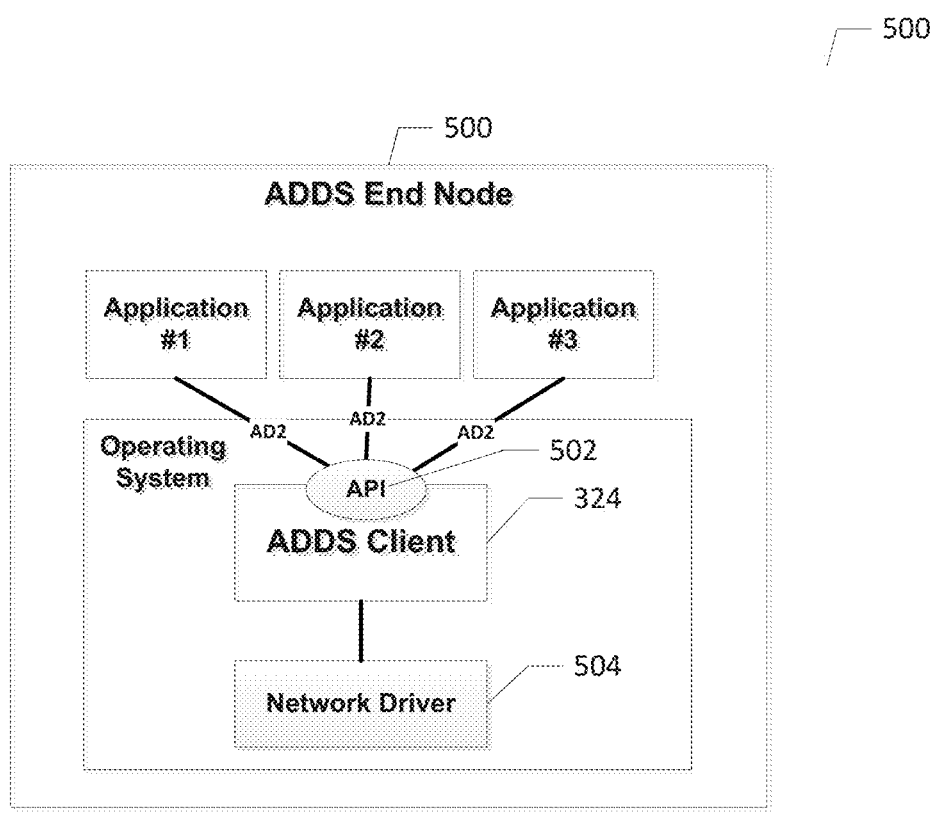
FIG. 5 illustrates one embodiment of an architecture of the ADDS client, when the ADDS client and applications utilizing the ADDS client reside in the same end node.

FIG. 5 illustrates one embodiment of an architecture of the ADDS client 324, when the ADDS client 324 and applications (e.g., Application#1, Application#2, and Application#3) reside in the same end node 500. The end node 500 may comprise a UE (such as UE's 104, 214, 324, and 318, SCS 306, AS 310, and SCS or AS 340 in FIGS. 1-4).

As shown, the applications in the host end node 500 use the AD2 interface to communicate with the ADDS client 324. In one embodiment, this interface may comprise a set of APIs 502 provided by the ADDS client to enable the applications to use the ADDS service. Applications can use these APIs 502 to register themselves with the ADDS entity 322 and to get an application ID. An application may also create different ADDS sockets (not shown), as needed, based on different communication requirements. For example, one socket may be used for immediate delivery of messages and one socket may be used for delayed delivery. In one embodiment, the APIs are provided to open an ADDS socket, send and receive data over the socket, and configure the socket with application characteristics. The ADDS client 324 maintains (i.e., stores in a memory of the end node 500) the characteristics of the sockets and their association with an application identifier. In one embodiment, the APIs 502 comprise the following:

addsRegister()
Returns an Application Identifier and a security token that are to be stored by the application. The application can also request a specific ID or a reserved application ID to be used.

addsOpenSocket()
Returns a socket like file descriptor to identify the socket. This file descriptor should be used for sending ADDS messages.

addsSockOptions()
Used by the application to configure ADDS client with the communication characteristics like delayed delivery, reliable delivery etc.

addsSend()
Send application data using ADDS.

addsCloseSocket()
Closes the ADDS socket addsDataQuery()
Check for pending messages to be delivered from the network.

addsReceive()
Read application data. A socket descriptor is not needed for reading messages.

addsEventSubscription()
Register with the network ADDS entity for some events (like registration de-registration) of other applications addsNotificationCallbackRegister()
Register a call-back function to be invoked when there is notification from the network based on the subscriptions made addsDeregister()
Deregister the application and release the application ID.

As further shown, the ADDS client 324 interface with the network driver(s) of the end node 500 to utilize their services for sending/receiving data and for learning and configuring the network transport path. For example, in the case of an UE, the ADDS client may interface with the MT (Mobile Termination) using a network/modem driver for sending/receiving ADDS data and retrieving capabilities of the MT and configuring the MT.

In one embodiment, in which the abstract architecture comprising a TE (e.g. a computer) and a MT interfaced by a TA (as described in 3GPP TS 27.007) is employed in the UE, the 'R' interface between the TE and MT may be updated with the following new AT commands to perform the following functions to enable the ADDS functionality:

(1) ADDS Configure. This function may be performed to inform the MT about the presence of an ADDS client and to let the MT request ADDS entity details from the network. The ADDS client information that may be registered using this command may be used by the MT to deliver the data to the ADDS client when it receives data over control plane (over NAS).

(2) ADDS Information Retrieval. This function may be used to retrieve the ADDS contact information details that the MT received from the network as described below.

(3) Data over NAS. This function may be used to let the ADDS client inform the MT that the data has to be sent over the control plane (e.g., NAS).

Figure 6:
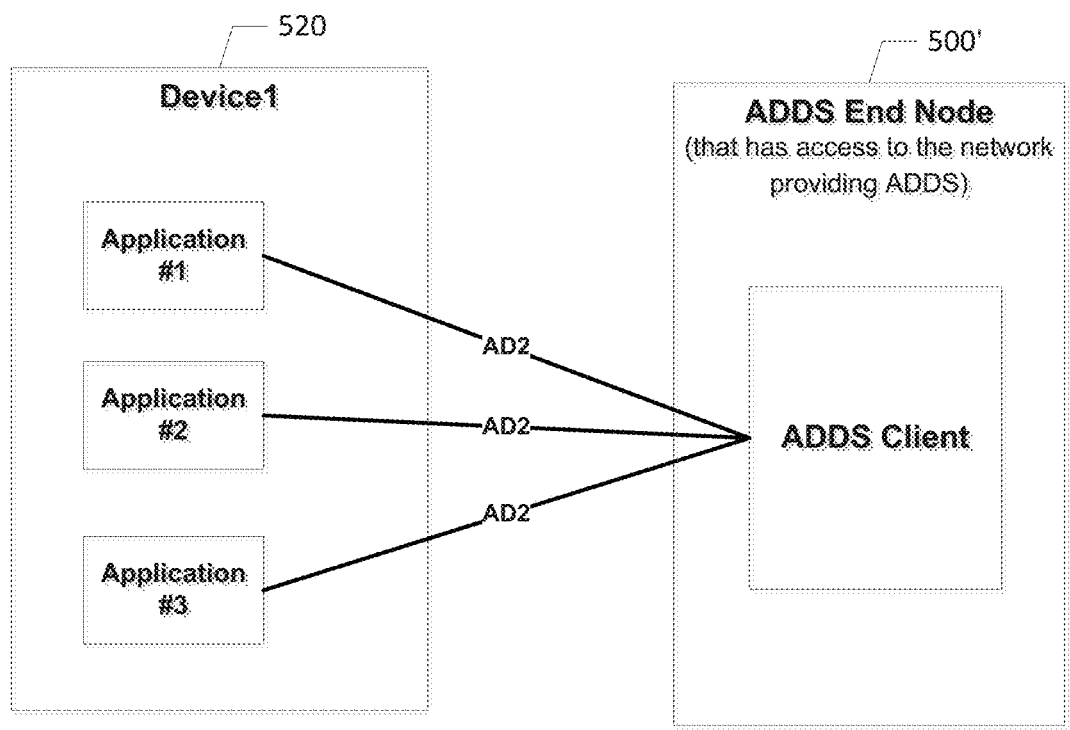
FIG. 6 illustrates another embodiment of an architecture of the ADDS client, in which the ADDS client interfaces with applications running on a different physical device from the end node on which the ADDS client is hosted.

FIG. 6 illustrates another embodiment of an architecture of the ADDS client 324, in which the ADDS client 324 interfaces with applications (Application #1, #2, and #3) running on a different physical device 520 from the end node 500' on which the ADDS client 324 is hosted. For example, this architecture may be used in an M2M scenario where an M2M application runs on a device that connects to an M2M gateway, where the gateway is a 3GPP UE that connects to a 3GPP network. In this architecture, the AD2 interface would depend on the network that is used between the end node 500' and the device on which the application resides. For example in a M2M scenario, this network may be based on ZigBee, 6LoWPAN, Wi-Fi or the like.

Adds Advertisement

This section describes methods by which a UE and an SCS may be made aware about the ADDS entity 322 and the services that are offered by the ADDS service. The purpose of ADDS advertisement is to let the UEs and SCSs be aware that the network supports ADDS functionality, to provide the capabilities of the ADDS entity like the supported transport methods/protocols, size of the application payloads, and the like, and to provide the contact details of the ADDS entity 322, such as its IP address, MSISDN, FQDN, or the like. In some embodiments, different methods may be used for ADDS advertisement to the ADDS clients on UEs versus ADDS clients on external nodes, such as an SCS or AS.

Adds Advertisement to a UE

The subsections below describe the various methods that can be used for ADDS advertisement to UEs. The choice of which method is employed depends on the ADDS architecture that is deployed (i.e., whether ADDS is implemented on an operator level or PDN level or if ADDS is in service domain) and the access type of the end device (i.e., whether the device uses 3GPP access or non-3GPP access to access the ADDS entity).

Attach Method

Figure 7:
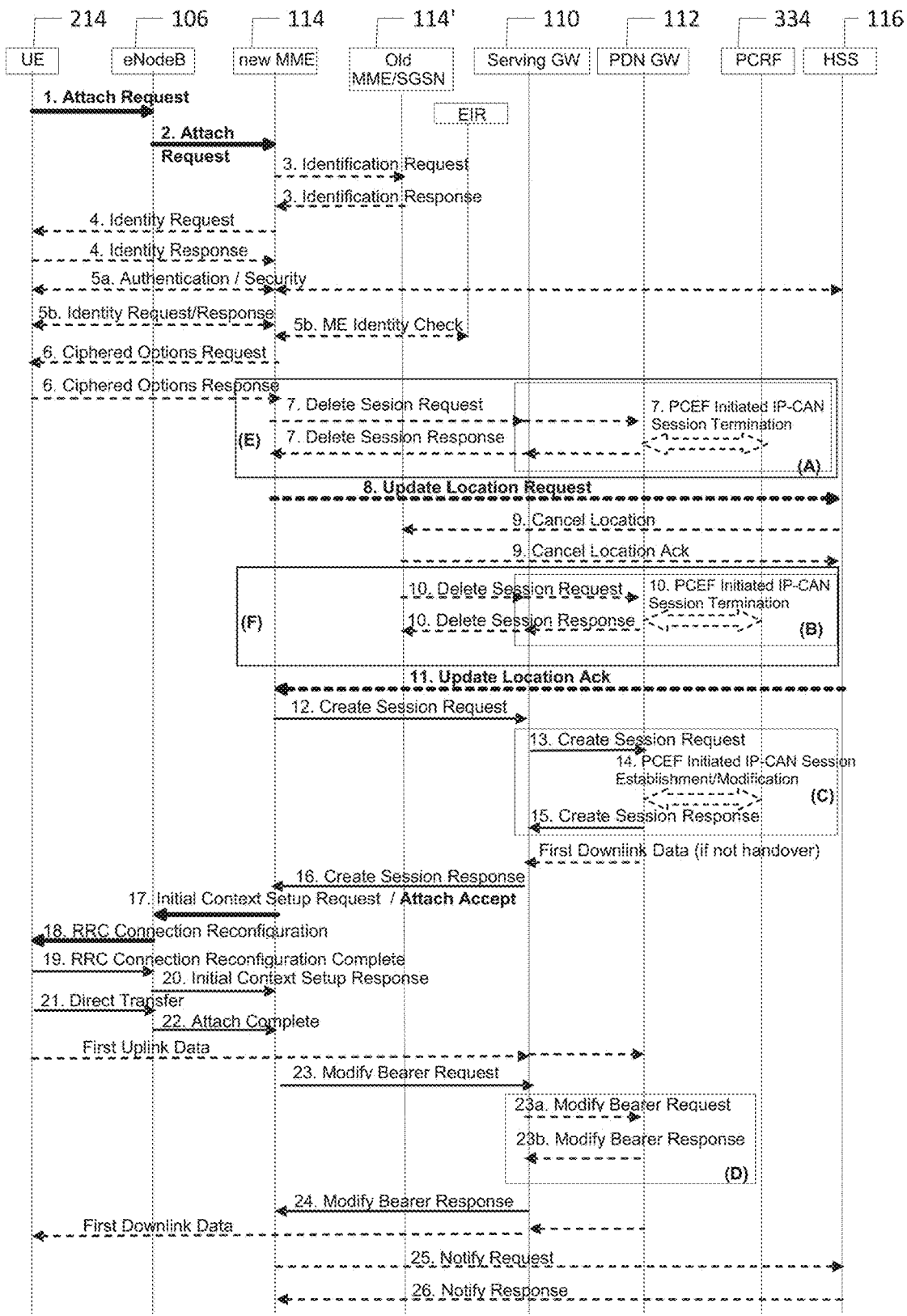
FIG. 7 illustrates one embodiment of a method for ADDS advertisement to a UE.

In one embodiment, a method for advertising ADDS to a UE employs the existing 3GPP Attach Accept message to provide the ADDS details to the UE. In particular, when a 3GPP UE/MS (e.g., UE 214 in FIGS. 2 and 4A-E) attaches to the network as per the Attach procedure mentioned in 3GPP TS 23.401 or 3GPP TS 23.060, the UE/MS 214 may request the ADDS details in the Attach Request message. The MME 114 can be configured with the ADDS information or it can retrieve it from the subscription information of the UE stored in the HSS 116 or HLR (not shown). The MME 114 can pass on the ADDS details to the UE in the Attach Accept message. FIG. 7 illustrates this method in the context of the existing 3GPP LTE UE attach procedure. In this embodiment, modified messages are used in steps 1, 2, 8, 11, 16, 17, and 18 to perform ADDS advertisement. The remaining steps are substantially unchanged from the existing 3GPP Attach procedure. Note that FIG. 7 illustrates the attach procedure in an LTE network, however the attach procedure in UMTS, GPRS, or other types of networks could also be enhanced in a similar way to perform ADDS advertisement.

Referring to the steps of the Attach procedure of FIG. 7—in particular the steps that are modified in the present embodiment to support ADDS advertisement—in steps 1-2, when the UE 214 sends an Attach Request to the core network an information element (IE) can be added to the message to indicate that the UE wishes to know about the ADDS details, if any, that are supported by the network. The 'UE network Capability' IE can also be enhanced to include an indication whether the UE supports ADDS functionality.

In step 8, the ULR message may be updated to include a flag to indicate that the MME 114 needs the ADDS information that is subscribed by the UE.

In step 11, the HSS may include the ADDS details in the ULA message. The 'Subscription Data' Diameter AVP that is defined in 3GPP TS 29.272 may be modified to include the ADDS details. The details may include the supported ADDS features, ADDS transport paths and their related information. An example of the details that may be included is shown in the Table 1 below.

TABLE 1

| ADDS Supported Features | |
| --- | --- |
| Application Discovery Supported | |
| Application Notification Supported | |
| Store-and-Forward Supported | |
| ADDS Transport Paths | |
| Transport method | Configuration details |
| SMS | Destination address for ADDS |
| | SMS-SC Address to be used |
| | Maximum allowed message size |
| | Data coding scheme |
| NAS | Maximum Message Size |
| | NAS Generic Container Type |
| USSD | USSD Details such as the USSD Code etc. |
| User Plane | IP address or FQDN of ADDS |
| | Transport protocol (such as TCP or UDP) to be used and the port number to be used |

In step 17, when the MME 114 sends the Attach Accept message, it can include the ADDS information as listed in Table 1. In step 18, the RRC Reconfiguration message from the eNB 106 may not be modified, however the piggybacked NAS attach Accept message may contain the ADDS information. All the other steps in the attach procedure are not affected and may be carried out as defined in 3GPP TS 23.401.

ADDS Information Request Procedure Method

Figure 8:
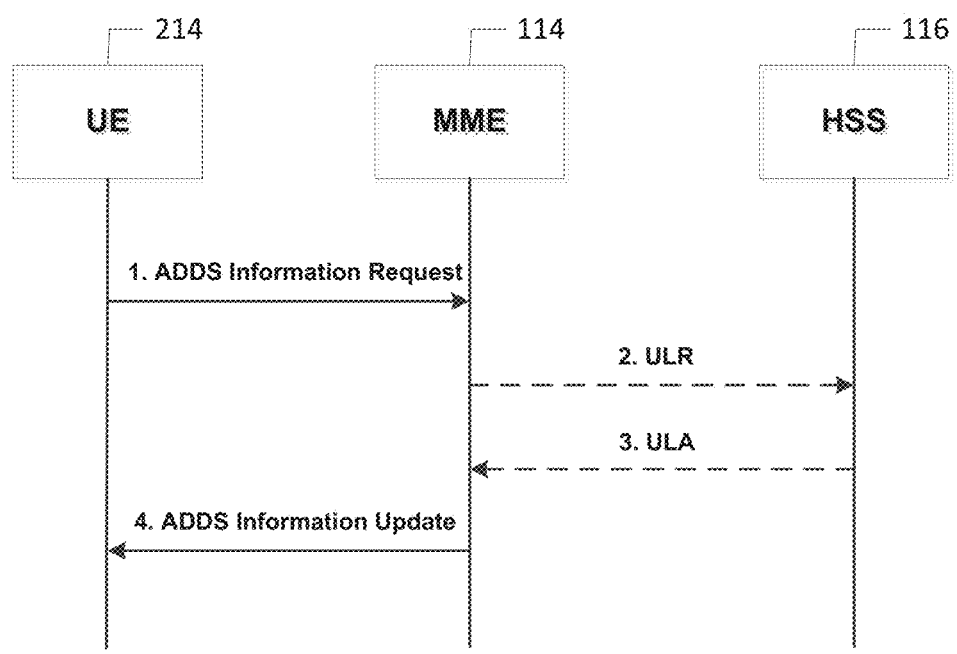
FIG. 8 illustrates another embodiment of a method for ADDS advertisement to a UE

FIG. 8 illustrates another method for ADDS advertisement, in accordance with one embodiment. In this method the UE 214 may request information about the ADDS functionality by executing a standalone ADDS information request. Specifically, as shown in FIG. 8, at step 1, the UE 214 sends a NAS EMM message to the MME 114 requesting ADDS information. At step 2, the MME 114 sends a ULR message to the HSS 116 to request ADDS information. In one embodiment, this step is optional and the MME 114 may send this request if the MME 114 does not already have the ADDS information. In step 3, the HSS 116 sends a ULA message in the same manner as described in step 11 of the method illustrated in FIG. 7 described above. In step 4, the MME 114 sends a NAS EMM message to update the UE 214 with the ADDS information. Note that, in other embodiments, a similar approach may be used in GPRS and UMTS networks where the Serving GPRS Support Node (SGSN) may respond to the ADDS Information Request.

Special APN Method

Figure 9:
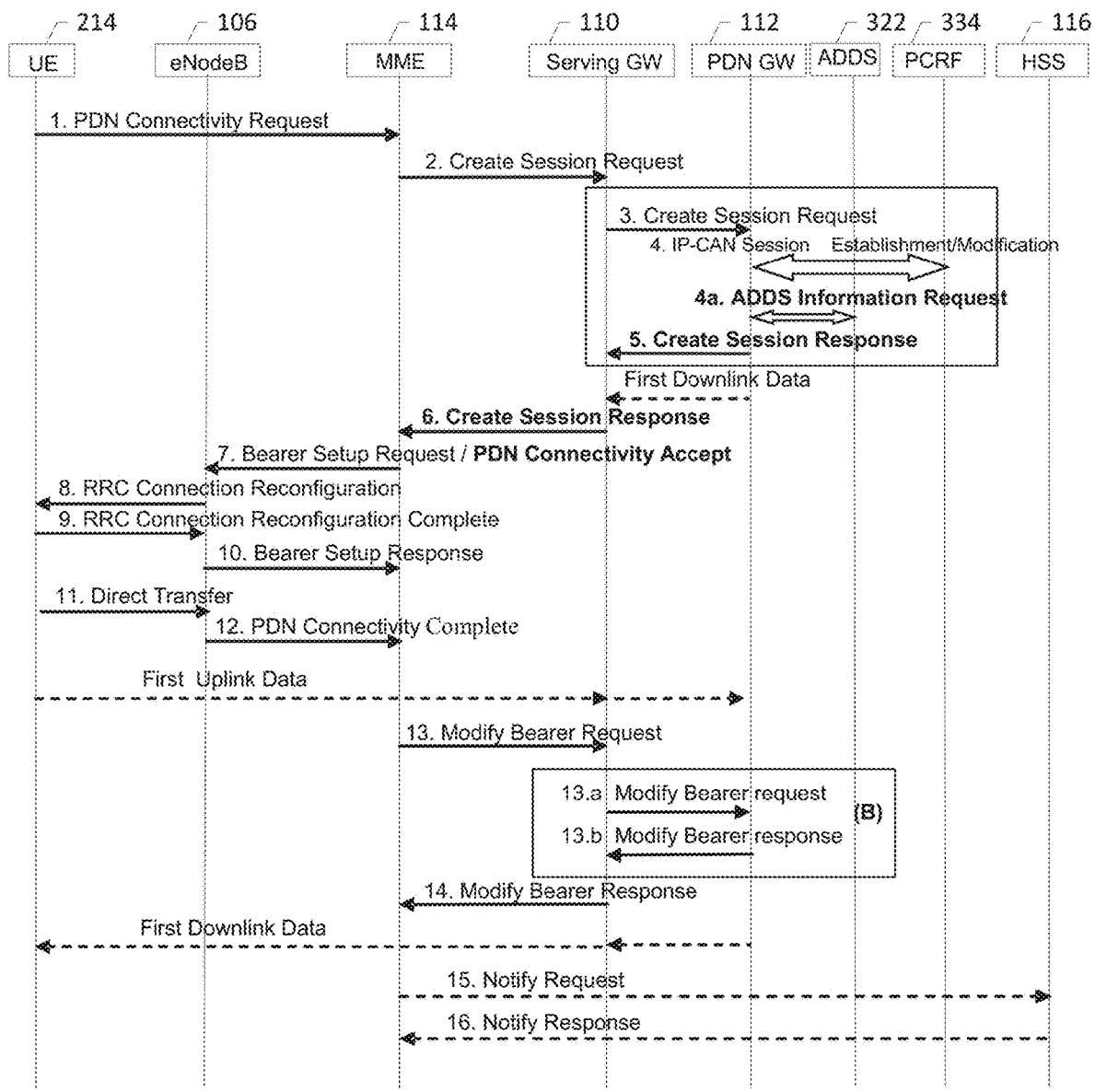
FIG. 9 illustrates yet another embodiment of a method for ADDS advertisement to a UE.

FIG. 9 illustrates yet another method for ADDS advertisement, in accordance with an embodiment thereof. Generally, a network operator can mark an APN exclusively for ADDS functionality. A UE that wishes to use ADDS can request a PDN connection to this special APN. The core network can infer that the UE requires ADDS information and can pass on the details to the UE in the existing 3GPP PDN Connectivity Accept message. This method may be applied when a 'private PDN' is used to connect the PGW to the ADDS entity, as illustrated in FIGS. 4A and 4B for example. PDN connection to the special APN may allow the UE to communicate with the ADDS through the network operator's private PDN.

The steps of FIG. 9 illustrate one embodiment of this method. Note that instead of providing an APN name, the UE 214 may include an indication that it wishes to make a PDN connection for accessing to an ADDS. The MME 114/HSS 116 can determine the APN that should be used for connecting to the private PDN through which the ADDS can be accessed.

Referring to FIG. 9, in step 1, the UE 214 can provide the special APN or a flag (new IE) in a NAS message such as the 3GPP 'PDN Connectivity Request' message to indicate that it requires ADDS. In steps 2 and 3, the special APN is passed to the PGW 112. In step 4a, the PGW 112 can optionally retrieve the latest information from the ADDS by sending an ADDS information query request. The ADDS can check with the HSS 116 (or a SPR or UDR) about authorization details of the UE 214 to use ADDS and then provide the details to the PGW 112.

In step 5, the PGW 112 may include the ADDS information (as listed in Table 1) in the existing 3GPP PCO IE of the 'Create Session Response' message and send it towards the UE 214. In steps 6, 7 and 8, the modified PCO IE from PGW 112 is transferred to the UE 214. In this embodiment, all the other steps in this PDN connectivity procedure are unaffected and remains substantially as defined in 3GPP TS 23.401.

PDN Connectivity Method

Another method that may be employed for ADDS advertisement is similar to the method illustrated in FIG. 9, but a special PDN is not used for the communication between the ADDS 322 and PGW 112. In this method, the UE 214 may connect to any PDN and may request ADDS functionality to be used for that PDN. Instead of using a special APN in the 'PDN Connectivity Request', the UE can include a new IE (e.g., a flag) in the 'PDN Connectivity Request' to indicate that ADDS details are requested. The PGW 112 can respond with ADDS details in the PCO IE of the 'Create Session Response' message. In this method, the call flow would be similar to FIG. 9.

User/Operator Provisioning

Another method for ADDS advertisement may rely on the user of the device to manually provision the ADDS information on the device as per the values that may be published by or obtained from the network operator. The network operator providing the ADDS functionality may alternatively dynamically provision the device with the ADDS information using existing Open Mobile Alliance (OMA) Device Management (DM) or Universal Subscriber Identity Module (USIM) Over-The-Air (OTA) update methods.

Adds Advertisement to SCS

This section describes methods by which the SCS may be made aware of the ADDS details offered by the core network.

Tsp Interface Method

Figure 10:
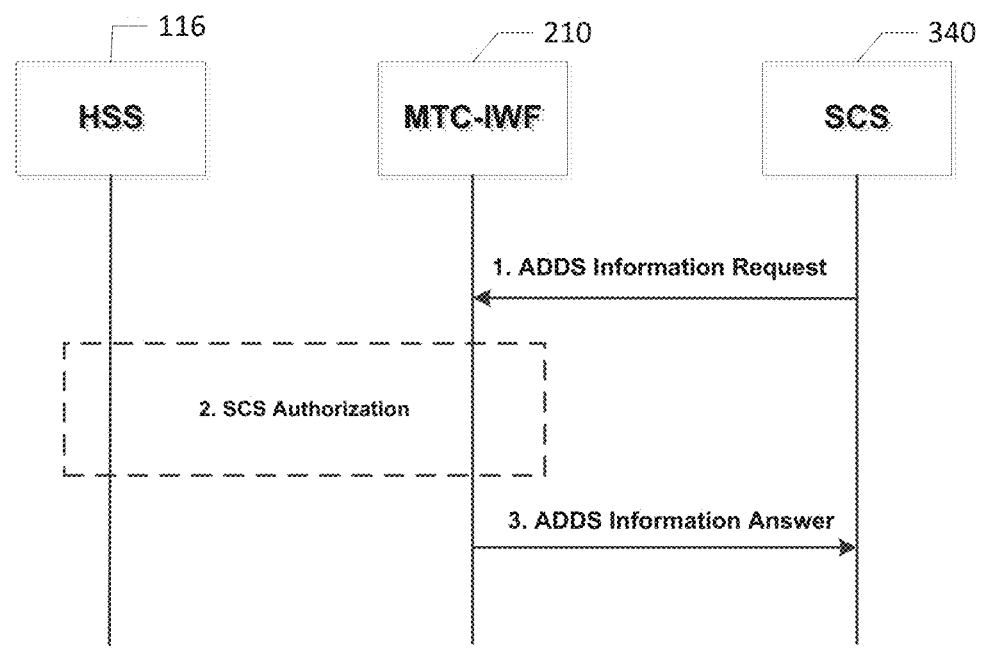
FIG. 10 illustrates one embodiment of a method for ADDS advertisement to an SCS.

FIG. 10 illustrates one embodiment of a method in which the Tsp interface is used for ADDS advertisement to an SCS. In this embodiment, the SCS 340 can request the ADDS information by sending a ADDS Information request over the Tsp interface as shown in step 1. In step 2, the MTC-IWF 210 can check with the HSS 116 for the authorization of SCS 340 to use the ADDS and provide the ADDS information to the SCS, as shown in step 3. The ADDS details provided to the SCS may have limited information, unlike the ADDS details that are provided to the UE, as the number of transport mechanism/path options between the ADDS and the SCS may be limited. An example of the ADDS details provided to the SCS are listed in Table 2 below.

Mh/Rx Interface Method

In accordance with another method for ADDS advertisement to the SCS, the SCS 340 may also retrieve the ADDS information listed in Table 2 over the existing 3GPP Mh or Rx interfaces. In the method, the ADDS information may be provisioned in the HSS 116 or the PCRF 334 to enable the SCS/AS 340 to retrieve this information via the Mh or Rx interface. The provisioning of this information in HSS and PCRF may be done by the network operator or dynamically by the ADDS entity 322 over the AD6 and AD3 interfaces that the ADDS has with HSS 116 and PCRF 340.

In other embodiments, the ADDS information on an SCS may be manually provisioned by the operator of an M2M network.

Adds Protocol Stack

As described above, an important feature of the ADDS service is the selection of one of a plurality of different transport mechanisms/paths available in the core network to carry ADDS data messages between applications. The ADDS client 324 and the ADDS entity 322 in the network select a transport path in accordance with the transport path selection criteria discussed above. The process of transmitting a data message is described more fully below in connection with FIG. 15. The communication between an ADDS client 322 on a network side end node, such as a SCS or AS 340 and the ADDS entity 322 may, in one embodiment, generally be IP based. The transport layer, such as TCP, UDP, or SCTP, that the ADDS service uses may depend on the characteristics of the message being sent, such as the importance of the message and whether a reliable transport mechanism is required for the particular message or application.

The communication between an ADDS client 324 on an access side end node, such as a UE (e.g., UE's 214, 312, and 318 in FIGS. 2-4), and the ADDS entity 322 may be performed over a selected one of others of the plurality of available transport mechanisms, such as, in one embodiment, the NAS, User Plane of SMS. FIGS. 11A-D illustrate the protocol stacks employed for each of these different transport mechanisms and the manner of transporting ADDS messages over these different transport paths.

Figure 11A:
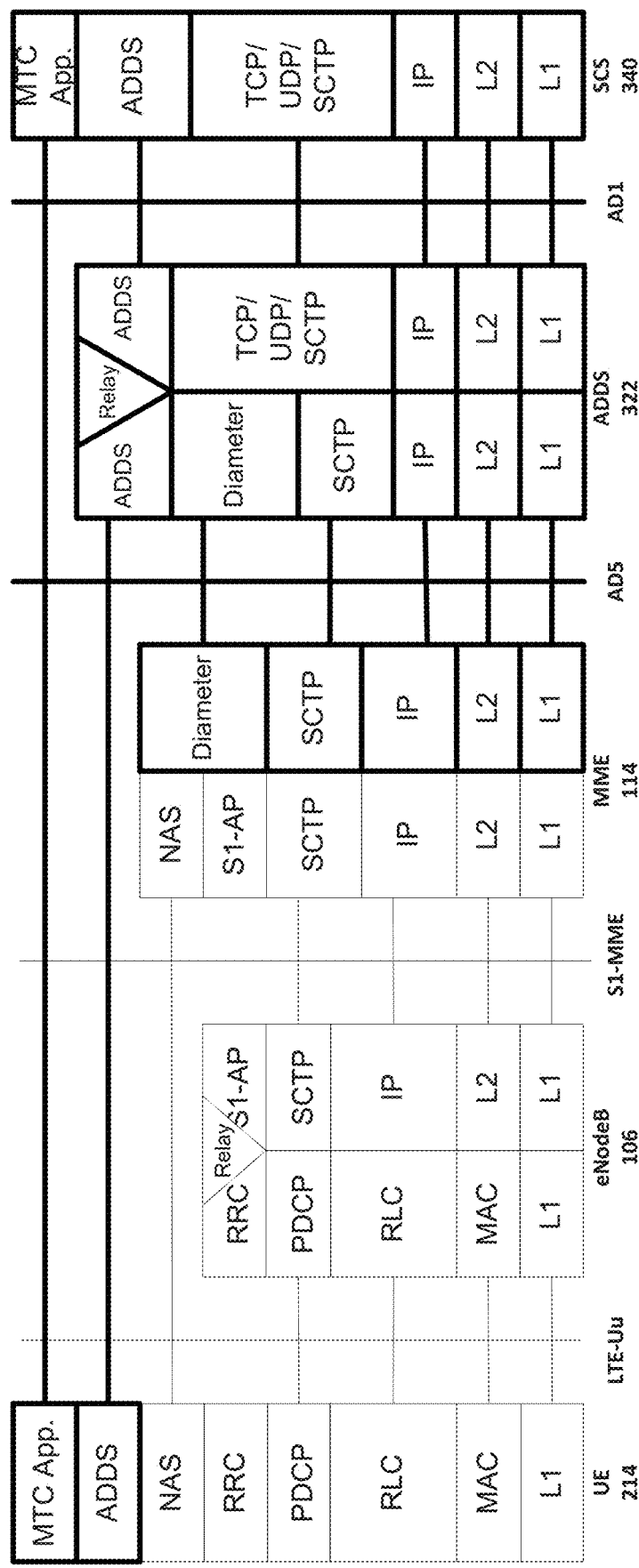
FIG. 11A shows the protocol stack for ADDS message transfer over NAS.

FIG. 11A shows the protocol stack for ADDS message transfer over NAS. In this embodiment, the ADDS messages, which as described in greater detail below may include an ADDS header and payload, are encapsulated in a generic NAS Transport message. In this case, the UPLINK GENERIC NAS TRANSPORT message may be used to carry the ADDS message from the UE 214 to MME 114, and the DOWNLINK GENERIC NAS TRANSPORT message may be used to carry the message from MME 114 to UE 214. These messages are described in 3GPP TS 23.401 (section 5.6.4 and 8.2.30). Also in this embodiment, the generic message container type IE of the NAS transport message can be set to one of the unused fields (e.g. "00000011") to indicate that the message is an ADDS message, and the generic message container IE may also be used to carry the complete payload to be delivered to ADDS.

In the uplink path, the MME 114 interprets that the Generic NAS message has to be delivered to ADDS, converts the payload to a Diameter message and sends it over the AD5 interface to the ADDS entity 322. The ADDS entity 322 interprets the message header, extracts the destination ADDS Application Identifier/Device Identifier and sends the message over the AD1 interface to the SCS 340.

In the downlink path, the SCS 340 provides the application identifier of the MTC Application and ADDS header and payload information to the ADDS entity 322 over the AD1 interface. If the AD5 transfer path is chosen for the message delivery, then ADDS entity 322 uses the destination application identifier and finds the IMSI of the UE (e.g., UE 214) on which the destination application resides. The ADDS entity converts the data to a Diameter message and sends it to the MME 114 along with the IMSI of the UE to which the message has to be sent via NAS. The MME 114 converts the Diameter message to a Downlink Generic NAS Transport message to transfer the message to the UE 214.

Figure 11B:
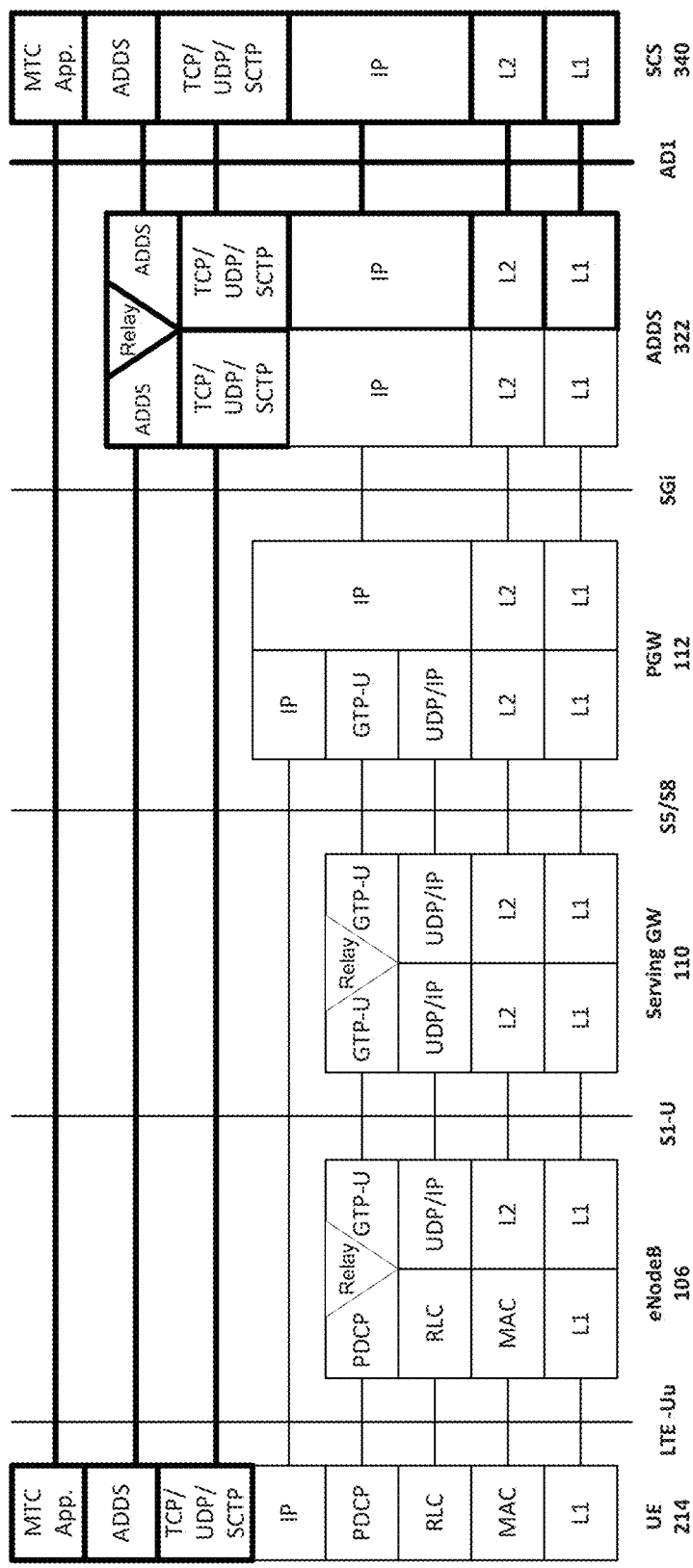
FIG. 11B shows the protocol stack for ADDS message transfer over the user plane.

FIG. 11B shows the protocol stack for ADDS message transfer over the user plane. In this case, the ADDS messages may be transported as regular user plane IP packets and transferred over GTP user plane.

In the uplink, the ADDS client 324 on the UE 214 may choose a transport protocol (e.g., TCP, UDP, or SCTP) to be used based on the message characteristics and sends an IP packet addressed to the IP address of the ADDS entity 322. This IP packet may follow the regular user plane and may be encapsulated in a GTP-U packet and transported via the eNodeB 106, SGW 110 and PGW 112 to the ADDS entity 322. The ADDS entity 322 interprets the received message, extracts the destination ADDS Application Identifier/Device Identifier and sends the message over the AD1 interface to the SCS 340.

In the downlink path, SCS 340 provides application identifier of the MTC Application and ADDS header and payload information to the ADDS entity 322 over the AD1 interface. If the user plane path is selected for the message delivery, then the ADDS entity 322 uses the destination application identifier and finds the IP Address of the UE on which the destination application resides (from the mapping table stored in the ADDS entity 322). The ADDS entity then chooses the transport protocol (e.g., TCP, UDP, or SCTP) to be used and builds an IP packet addressed to the UE's IP address and sends it to PGW 112 on the SGi interface.

Figure 11C:
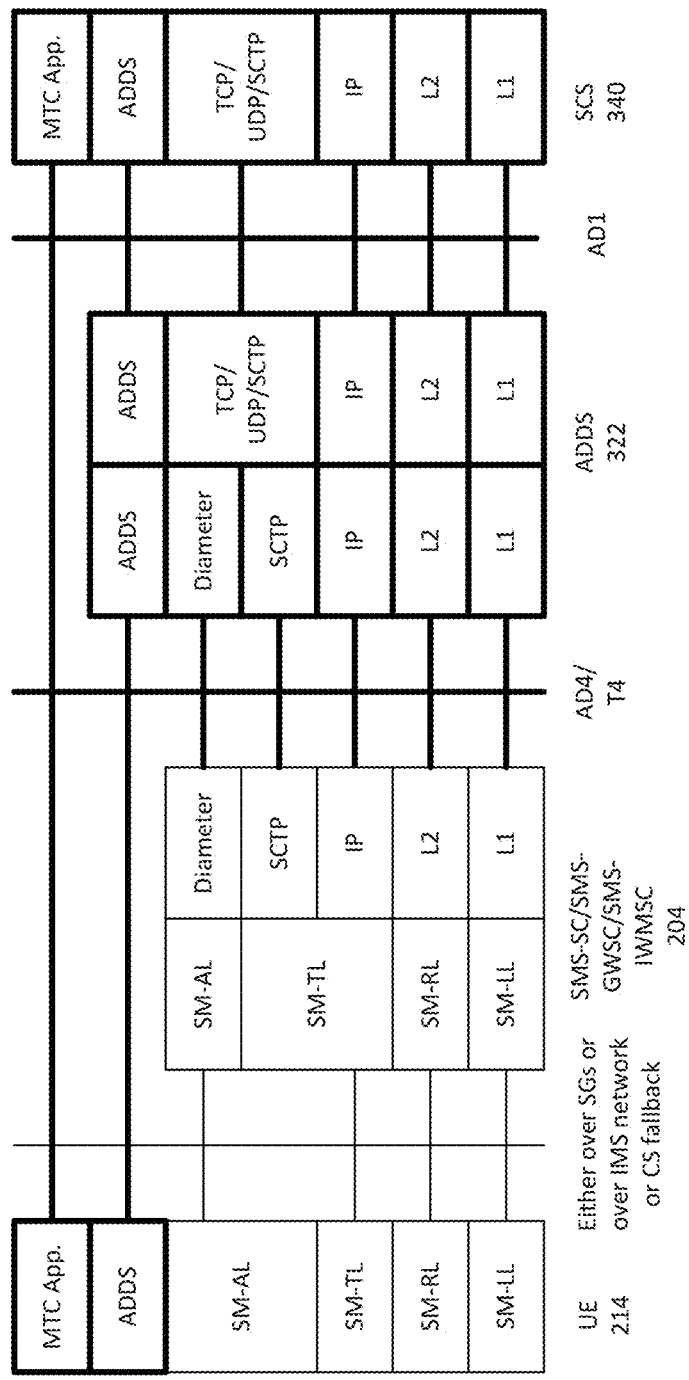
FIG. 11C shows the protocol stack for ADDS message transfer using SMS.

FIG. 11C shows the protocol stack for ADDS message transfer using SMS. In this embodiment, the ADDS messages may be transported as SMS messages.

In the uplink path, the UE encapsulates the ADDS message in a SMS TPDU and transports it as an Mobile Originated SMS (MO SMS) message. In this embodiment, the SMS message is addressed to the ADDS entity by setting the TP Destination Address (TP-DA) to the address of the ADDS entity 322. The ADDS entity 322 interprets the received message, extracts the destination ADDS Application Identifier/Device Identifier and sends the message over the AD1 interface to the SCS 340.

In the downlink path, the SCS 340 provides application identifier of the MTC Application and ADDS header and payload information to the ADDS 322 over the AD1 interface. If the SMS transport mechanism/path is chosen for the message delivery, then the ADDS entity 322 uses the destination application identifier to find, from its stored mapping table, the address (MSISDN) of the UE 214 on which the destination application resides. In this embodiment, the ADDS 322 acts as an external SME and sends the ADDS message to an SMS-SC 204 to be transported as an Mobile Termination (MT) SMS. The interface between the SMS-SC 204 and the ADDS entity 322 may be based on the Diameter protocol similar to the T4 interface between the MTC-IWF 210 and SMS-SC 204. Alternatively, other protocols may be used, such as Short Message Peer-to-Peer (SMPP), Computer Interface to Message Distribution (CIMD) or Universal Computer Protocol/External Machine Interface (UCP/EMI). The SMS message may be transported between the UE 214 and the ADDS entity 322 using any of the available methods, such as SMS over the SGs reference point, over an IMS network, or using Circuit Switched (CS) fallback.

Figure 11D:
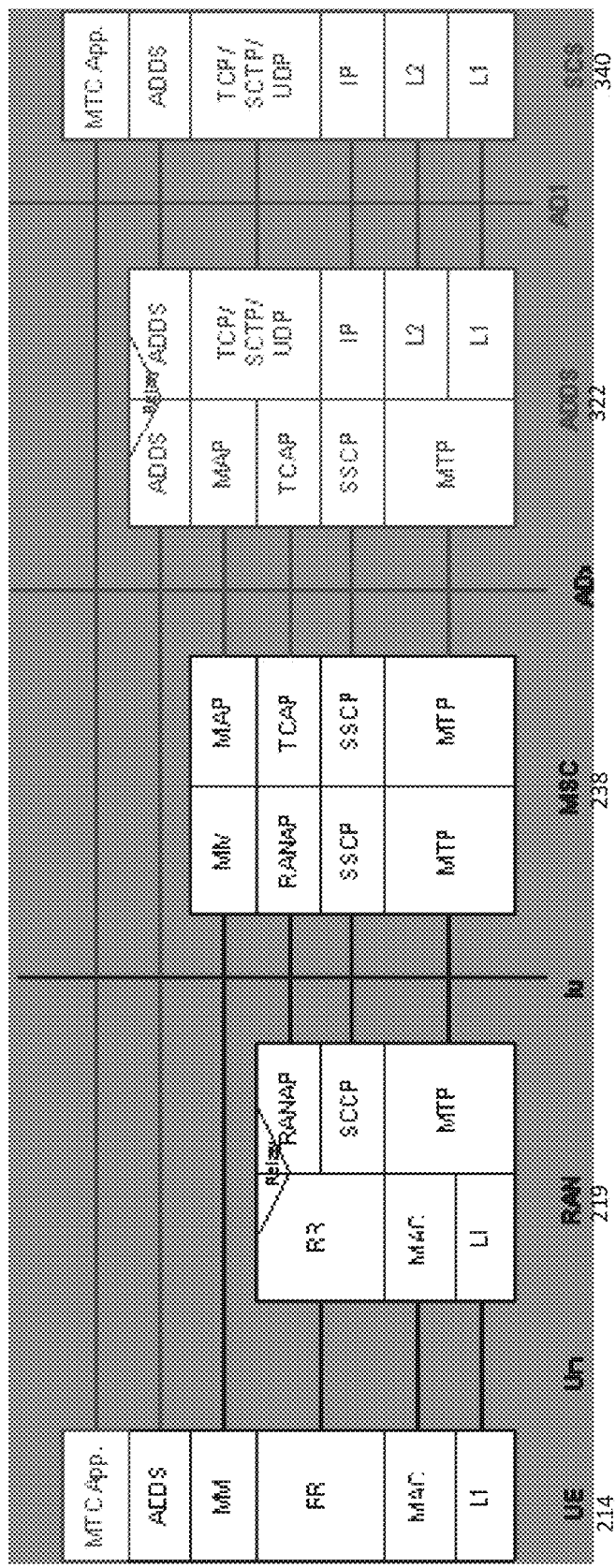
FIG. 11D shows the protocol stack for ADDS message transfer using USSD.

FIG. 11D shows the protocol stack for ADDS message transfer using USSD. In this case, the ADDS messages are transported as USSD messages.

In the uplink path, the USSD element in the UE 214 encapsulates the ADDS messages in a USSD Data Burst Message and it is transported as a mobile initiated USSD. The USSD message may be addressed to the ADDS entity 322 by setting the USSD short code of the USSD gateway in the ADDS entity 322. The ADDS entity 322 interprets the received message, extracts the destination ADDS Application Identifier/Device Identifier and sends the message over the AD1 interface to the SCS 340.

In the downlink path, the SCS 340 provides application identifier of the MTC Application and ADDS header and payload information to the ADDS 322 over the AD1 interface. If the USSD transport mechanism/path is chosen for the message delivery, then the ADDS entity 322 uses the destination application identifier to find from its internal mapping table the USSD code of the UE 214. In this embodiment, the ADDS entity 322 acts as a USSD gateway and sends the ADDS message encapsulated in a USSD Request message or USSD Notify message to an MSC 238 to be transported as a network initiated USSD. The interface between the MSC 238 and the USSD gateway in the ADDS entity 322 may, in one embodiment, be based on MAP protocol.

Adds Protocol and Message Format

As illustrated in FIGS. 11A-D, an ADDS protocol is used for communication between an ADDS client 324 on a UE (e.g., UE 214) or SCS (e.g., SCS 340) and the ADDS entity 322 in the network. The ADDS protocol may perform segmentation and re-assembly of ADDS messages based on the transport mechanism/path that is selected for message delivery. Sequence numbers may be used in the ADDS protocol to enable re-ordering of ADDS messages that are transported via different paths.

Figure 12:
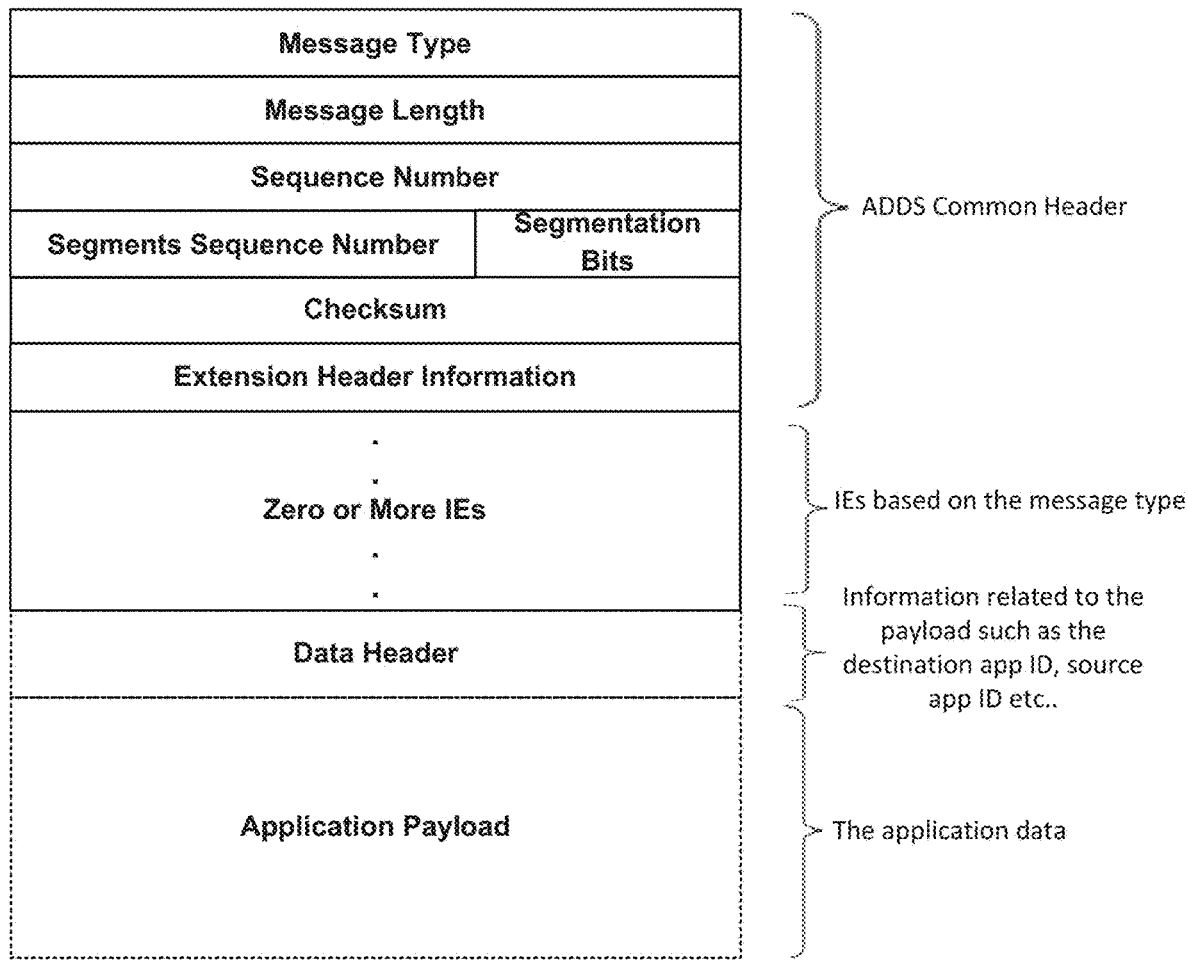
FIG. 12 illustrates the format of an ADDS message, in accordance with one embodiment thereof

In one embodiment, the ADDS messages may have a common header and may carry ADDS control information related to ADDS procedures, such as transport characteristics, application characteristics, and the like. Application data may also be carried in a similar way with the inclusion of an additional data header that contains information about the data. The data header and the payload may be present only in 'ADDS Data Transfer Request' and 'ADDS Data Delivery' messages described more fully below. FIG. 12 illustrates the format of an ADDS message, in accordance with one embodiment thereof. The following describes each of the fields of the common header of the message format:

Message Type: Indicates the type of the message being sent.
Message Length: Total length of the ADDS message
Sequence number: A number assigned by the sending entity in an increasing order.
Segmentation Bits: Indicates whether the message is segmented.

| Segmentation Bits | Meaning |
| --- | --- |
| 00 | No Segmentation |
| 01 | First packet |
| 10 | Middle packet |
| 11 | End packet |

Segments Sequence Number: The sequence number of individual segments of a ADDS message. This is valid only if the Segmentation Bits IE is not set to '00'.
Checksum: The checksum for integrity check of the payload.
Extension Header Information: This may be used if additional information is to be carried like error information, security etc.

As further shown in FIG. 7, the ADDS common header is followed by zero or more information elements (IEs) depending on the message type, and then by the header that is specific to the data being transmitted and then the application data itself in the application payload field.

The following is a list of ADDS messages that may be transmitted, in accordance with one embodiment of the ADDS service. The contents of these messages are described below in connection with the description of the various ADDS procedures that utilize them.

ADDS Application Register Request
ADDS Application Register Response
ADDS Application Event Notification
ADDS Application Event Response
ADDS Application Update Request
ADDS Application Update Response
ADDS Data Transfer Request*
ADDS Data Transfer Accept
ADDS Data Delivery*
ADDS Data Transfer Complete
ADDS Data Notification
ADDS Data Notification Ack
ADDS Data Query
ADDS Data Query Ack
ADDS Data Request
ADDS Event Subscription Request
ADDS Event Subscription Ack
ADDS Application De-Registration Request
ADDS Application De-Registration Response The asterisk ("*") next to certain of the message types indicates that message type may carry application data.

Adds Procedures

This section describes a number of procedures that may be carried out by the ADDS service in order to provide its functionality. These procedures include ADDS Application Registration, ADDS Update Procedure, ADDS Data Transfer, ADDS Event Subscription, and ADDS Application Deregistration. In other embodiments, more or less procedures may be provided. Each of these procedures is discuss more fully below.

Adds Application Registration

The purpose of the application registration procedure is to assign an application identifier to an application that requires to use ADDS functionality. When an application in an end node opens an ADDS socket, the ADDS client initiates the 'ADDS Application Registration' procedure to request the network ADDS entity to allocate an ADDS application identifier to the application. The ADDS entity submits a request to the HSS/UDR for subscription information of the requesting end node (UE or SCS) and for translating the device identifier to an internal identifier like IMSI or SCS ID. The ADDS entity then allocates an application identifier and maintains the mapping of the application identifier with the device identifier (e.g., UE ID or SCS ID) (also referred to herein as the "device ID"). The ADDS entity may also provide the application details to the PCRF to get the policy and charging details to be enforced for the application.

Figure 13:
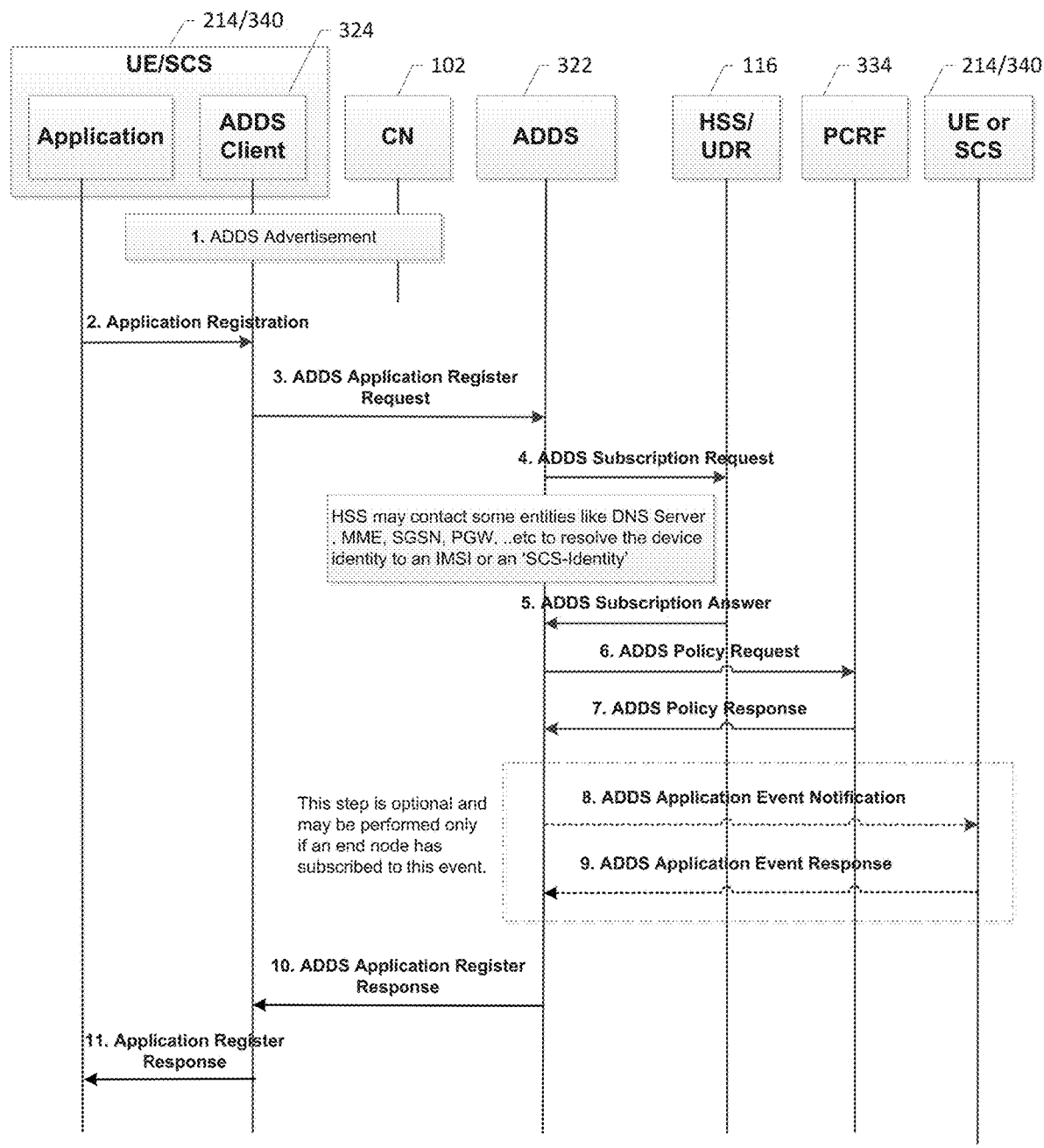
FIG. 13 shows an example call flow for a method of application registration, in accordance with one embodiment thereof.

The network may perform additional steps depending on the end node that is trying to register an application. For example if the procedure was initiated by an application in the UE, then the ADDS entity may check/inform the corresponding SCS and provide the application details (like application type and application ID) of the UE. The SCS can thus learn the application details and use the UE's application IDs for future communications with the UE. The SCS can provide additional policy and charging information for the application traffic. For example, the SCS in its response can change the application details like the delay tolerance time of the application, application availability time, and the like. The SCS can also provide the charging characteristics, such as online or offline charging, to be applied and sponsor details if the SCS has to be charged for the application traffic. FIG. 13 shows an example call flow for this procedure, in accordance with one embodiment thereof In step 1, the ADDS client 324 learns the contact details of the network ADDS entity 322 through one of the ADDS advertisement procedures described above.

In step 2, an Application uses the AD2 interface API to register with the ADDS client 324.

In step 3, the ADDS client 324 sends an 'ADDS Application Register Request' to the ADDS entity 322 to request an application identifier for the application. This message is sent over the AD1 interface and this message can be sent over any of the available transport mechanisms (e.g., NAS, SMS, USSD, user plane). In one embodiment, the following information is sent in this message:
  a. ADDS Message Type:
  This indicates that the message is an 'ADDS Application Register Request' message.
  b. Device Type:
  This is to indicate if the end node on which the application is running is an UE or a network entity like SCS.
  c. Device Identity:
  A device identifier that can be used by the network to uniquely identify the device. This can be an identifier that was allocated by the network or a globally known/resolvable identifier. The following are some identifiers that can be used for device identification. The identifier that is used depends on the end node type.

For UE
    i. IMSI
    ii. MSISDN
    iii. GUTI/PTMSI
    iv. Network assigned IP address (not the local IP if the UE is behind a NAT device)
    v. M2M External Identifier
    vi. SIP URI
    vii. NAI
  For network node
    i. SCS ID/External ID
    ii. FQDN
    iii. SIP URI
    iv. NAI
    v. IP Address
  d. Requested Application Identifier
  This is an optional field and contains a valid application identifier. An application can request for an application identifier to be allocated to it. Normally, this may be used if an application was previously registered and wants to reuse the same application identifier after an application restart or failure or application being moved to another device. However this may also be used by application that was not registered previously to request for a specific application ID.
  e. Security Token
  This field may be included if an application requests for the re-use of an application identifier that was previously allocated to it. This may be same as the security token value that was provided by the ADDS Entity when it assigned the application ID to the application previously. This is to authenticate that the some other application is not trying dupe an application. This is for authentication purposes to avoid other applications from falsely claiming another application's application ID so as to receive its messages.
  f. Application Details
  The field contains application characteristics and details. This can be used by the ADDS for data scheduling and transport mechanism/path selection purposes.
  Application Type
  Application Name
  Application Instance
  Application Characteristics
    Delay tolerance—How long a message destined to or from the application can be delayed
    Application Availability—The time period during which the application will be available.
    Maximum Message Size—The maximum size of the message that the application would send/receive.
    UL Maximum Size
    DL Maximum Size
    Periodicity—This indicates how often the application intends to perform data transfer using ADDS. This may relate to an application level procedure or a session.
    Duration of the data transfer—The time duration for which the data transfer over ADDS would be used.
    Message Rate—The number of messages that would be sent/received in the 'Duration of the data transfer'. It may have two sub fields
    UL Message rate
    DL Message rate
    Maximum Total Amount of Data—The maximum total amount of data that would be transferred. It may have two sub fields
    UL Maximum Data
    DL Maximum Data Discard Messages—A flag to indicate if the communication exceeds the agreed parameters. For example if message size or rate becomes higher.
Acceptable Message Loss rate
Reliable Delivery
    Message Submission Report
    Message delivery Report
All of these parameters are not mandatory. It can be included as per application needs to describe the application data transfer requirements. For example, if a temperature reading application has to send the readings on an hourly basis then it may set the characteristics as below
    Delay Tolerance: 25 minutes
    Periodicity: Every 1 hour
    Duration of the transfer: 5 Seconds
    Maximum Message Size
        UL Maximum Size: 120 Bytes
        DL Maximum Size: 80 Bytes
    Message rate
        UL Message Rate: 4
        DL Message Rate: 2
    Maximum Total Data
        UL Max Data: 350 Bytes
        DL Max Data: 100 Bytes
    g. Device Information
This is an optional field. Device level information may also be provided to assist the ADDS Entity in ADDS message scheduling and routing.
    Device Available Time—When the device can be contacted for MT data.
    Device Mobility Info—If the device may be stationary or roaming.
    h. ADDS Options
        i. Message Notification Requested
When this option is set, the ADDS Entity may store the messages and inform the end node about the arrival of the ADDS message and the message details (like its size). The ADDS Client can pull the message at a later time.
        ii. Max Message Size for Notification
Maximum message size for which notification has to be sent.
        i. Available Transport paths
The list of different transport mechanisms/paths that are available with the device and their characteristics. One or more of the following information may be provided. The information depends of the device type (e.g NAS may be applicable only for UEs):
    1. SMS
        a. SMS-SC Address
        b. MSISDN of the device
        c. Maximum Message Size
        d. Data-Coding to be used
        e. SMS Application Port Number to be used
    2. NAS
        a. Maximum Message Size
    3. USSD
        a. USSD Code
    4. User Plane
        a. IP Address to be used
        b. Transport protocol to be used
In step 4, the ADDS entity 322 sends an 'ADDS Subscription Request' message to the HSS 116. This message may contain the following Info.
    a. Device Type
    b. Device Identifier
    c. Device Details
    d. Reported Transport Paths
    e. Requested Application Identifier The 'Device Identifier' that was provided may have to be translated into an IMSI or an 'SCS-Identity' in order to retrieve the corresponding subscription records. The HSS/UDR may execute a 'Device Identifier' translation procedure and may contact some nodes, such as a DNS Server, MME, SGSN, PGW or the like, to resolve the device identifier to an IMSI or an 'SCS-Identity'. Some of the IDs, such as 'External Identifiers' or 'MSISDN,' may be translated by the HSS/UDR itself. The HSS/UDR retrieves the related subscription information and checks if the UE or the SCS is authorized to use ADDS service.

In step 5, the HSS/UDR sends an ADDS Subscription Answer message containing the following ADDS Authorization Information:
    a. IMSI or SCS-Identifier
    b Subscription Information
        i. Allowed Transport Paths
        ii. Subscribed Application ID
        iii. Application ID Portability—Indicates whether the application ID should be allocated such that the application can change the host devices.
        iv. Device Characteristics—Subscribed/restricted device characteristics (e.g., MTC features) like the device mobility details and availability time etc.
        v. Peer Information—Like the corresponding SCS and the events that are to be reported to the SCS.

In step 6, the ADDS entity sends an 'ADDS Policy Request' message to the PCRF to request ADDS specific policies and charging information. This message may contain the following information:
    a. IMSI or SCS Identifier
    b. Application Details/Characteristics In step 7, the PCRF 334 responds with an 'ADDS Policy Response' message that provides the policy and charging details to be used for the application. This message may contain the following information:
    a. Policy Information—Message scheduling, size and routing information
    b. Charging Information In step 8, the ADDS entity 322 sends an 'ADDS Application Event Notification' message to notify an end node, such as an SCS, that one of its devices has registered an application for ADDS. Interested applications may register for this event as per the 'ADDS Event Subscription Procedure' described below. The following details may be sent in this message:
    a. Destination Application ID—The destination application that should receive the notification
    b. Occurred Event Type: This may be set to 'Application Register Event'.
    c. Application ID—The application ID that was allocated to the registering application
    d. Device Information
    e. Application Details as described in step 3*f.*

In step 9, the end node sends an 'ADDS Application Event Response' message. A SCS may respond with some authorization information and also some information that needs to be passed on to the application. This message may contain the below information:
    a. Policy Information—The application characteristics to be applied.
    b. Charging Information—like offline online charging to be applied and if the application is sponsored by the SCS.
    c. Application Restrictions—Information like if the UE application can be allowed to communicate with other applications or its communication should be restricted only to the SCS. The ADDS entity can ensure that no other end node is sending messages to the UE's application and/or the UE is also not sending to other end nodes.
d. Peer Application Information—Like the corresponding SCS application ID to be provided to the UE and its characteristics.

In step 10, the ADDS entity sends an 'ADDS Application Register Accept' message to the ADDS client in the end node. This message contains the following information:
  a. Allocated Application Identifier
  b. Application ID Portability
  c. Application ID Lease Time
  d. Allowed Transport Paths and their characteristics. This is similar to the information listed in Table 6 2
  e. Negotiated Application characteristics—This will be the final application characteristics that the network accepted.
  f. Security Token
  g. Peer Application Information Lastly, in step 11, the ADDS client passes the information received from the ADDS entity to the application. This information may contain the following
  a. Allocated Application Identifier
  b. Application ID Portability
  c. Application ID lease Time
  d. Negotiated Application characteristics
  e. Security Token
  f. Peer Application Information Adds Update Procedure An ADDS client 324 or the network ADDS entity 322 may perform an ADDS update procedure to inform about any changes in the ADDS capabilities or application characteristics. This procedure may be used to inform the ADDS about path level changes (that affects all the applications on the end node) or per application level changes (like the application characteristics). The following characteristics and capabilities may be updated using this procedure.
  1. Data Path changes
  2. Application characteristics changes
  3. UE characteristics changes
  4. ADDS Option changes
  5. Subscription changes
  6. Application ID renewal This procedure may be initiated by the end node or the network ADDS entity, and the procedure differs somewhat based on which entity initiates the procedure. Both variations are shown in FIG. 14.

End Node Initiated ADDS Update Procedure

The ADDS client in an end node may decide to send an ADDS update message based on the following events:
  a. Application Indication. An application updates its communication requirements/characteristics to the ADDS client.
  b. User Provisioning: The user of the end node has changed some node level parameters that affect the node's ADDS capabilities like the transport paths that are available or their characteristics.
  c. Application ID Renewal—The Application ID lease timer is about to expire and needs to be renewed.

Figure 14:
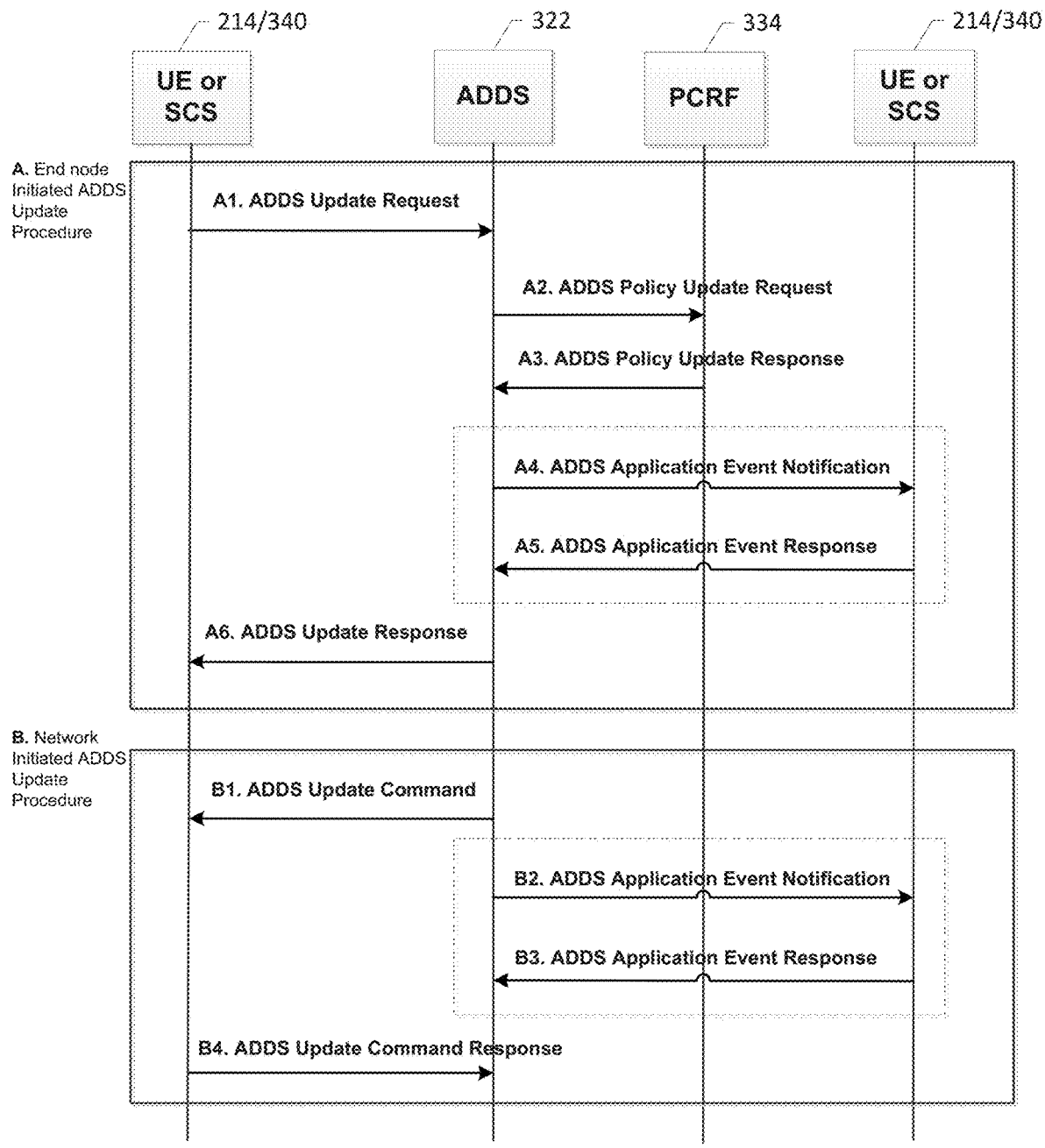
FIG. 14 illustrates embodiments of a process by which an end node or the network initiates and performs an ADDS update procedure.

Steps A1-A6 of FIG. 14 illustrate one embodiment of the process by which an end node initiates and performs the ADDS update procedure. As shown, in step A1, the ADDS client sends an 'ADDS Update Request' message to the ADDS entity that may contain the following information:
  a. ADDS Message Type—Indicates that this is an 'ADDS Update Request' message
  b. Update Type—This can be application level or end node level. It can take any of the following values.
      i. Application Characteristics update
      ii. Application ID Renewal
      iii. Device Characteristics Update
      iv. Available Transport Paths
      v. ADDS Options Update Note: the inclusion of the following IEs depends on the update type. These IEs are described in detail in step 3 of 6.7.1.
  c. Application ID—This is included if a specific application details has to be updated.
  d. Application Details
  e. Device Information
  f. ADDS options
  g. Device identity—the device has to provide the same identity that it provided in the 'ADDS Application registration Procedure'

In step A2, the ADDS entity sends an 'ADDS Policy Update Request' message to the PCRF to get the updated policy information based on the updated characteristics.

In step A3, the PCRF sends an 'ADDS Policy Update Response' message with the updated policy and charging information.

In step A4, the ADDS entity sends an 'ADDS Application Event Notification' message to the peer application end node. This message may be sent if the peer application end node information is available in the subscription information or if a node has subscribed for notifications using the 'ADDS Event Subscription Procedure' described below. This step is similar to step 8 of FIG. 13.

In step A5, the end node sends an 'ADDS Application Event Response' message. This step is similar to step 9 of FIG. 13.

In step A6, the ADDS entity sends an 'ADDS Update Response' message to provide the parameters that are accepted by the network. This message contains the information similar to the 'ADDS Register Accept' message described in step 10 of FIG. 13.

Network Initiated ADDS Update Procedure

The ADDS entity in the network may decide to send an ADDS update command message to the ADDS client to inform about certain changes or to provide commands about the transport path that needs to be used. This message may be sent based on the following events:
  a. Operator provisioning.
  b. Network conditions like the overload conditions or other node/service availability.
  c. Policy change notification from PCRF
  d. Subscription Change Notification from HSS/UDR Steps B1-B4 of FIG. 14 illustrate one embodiment of the process by which the network ADDS entity initiates and performs the ADDS update procedure.

As shown, in step B1, the ADDS entity sends an 'ADDS Update Command' Message to the ADDS client in an end node. This update may be for a specific application or for the end node. This message may contain the following information a. ADDS Message Type—Indicates that this is an 'ADDS Update Command Request' message
b. Update Type—Indicates if a specific application is affected or the end node is affected.

Note: the inclusion of the following IEs depends on the update type. These IEs are described in detail above in connection with FIG. 13.

c. Application ID—This is included if a specific application details has to be updated.
d. Application ID lease Time
e. Negotiated Application characteristics
f. ADDS entity Transport Path Information The ADDS client receives the information and configures itself accordingly. It may optionally inform the affected application based on the information that is updated.

Step B2 is similar to step A4 above, and step B3 is similar to step A5 above.

In step B4, the ADDS client sends an 'ADDS Update Command Response' to the ADDS entity to confirm that the ADDS client has updated itself with the provided information.

Adds Data Transfer

The ADDS data transfer procedure is the procedure used by an application to transfer data using ADDS. This procedure enables the applications residing at the ADDS end nodes (SCS/UE) to send application specific data using ADDS. An ADDS end node uses the application identifier as the destination identifier and passes the application data and its characteristics to the underlying ADDS client. The ADDS client chooses the delivery mechanism/path to transport the message to the ADDS Server. The ADDS client may also perform segmentation on the application data if the size of the application data exceeds the maximum limit of the payload supported by the chosen transport protocol (for example in case of NAS and SMS). The ADDS entity considers the network policies, load conditions, end node status and application data characteristics in deciding the time and method of delivering the data to the destination application. The ADDS entity may interact with the OFCS and OCS for charging control purposes.

The sending application can request reliable data delivery and may request the ADDS to acknowledge the receipt of the data and also provide a delivery report about when the ADDS message is successfully delivered to the destined application.

Data Delivery Notification Procedure

In one embodiment, if the receiving application/end node has requested the ADDS that it be notified about the ADDS messages before delivering them (as mentioned above in connection with the application registration procedure) then the ADDS entity sends a notification to the end node containing the details about the message. The end node/application can then at a later time send a specific request to retrieve this message. Optionally the end node can set a flag in the notification acknowledgement message if the message has to be immediately delivered or provide a time period in which the delivery attempt may be made.

Data Query/Polling Procedure

In one embodiment, the ADDS client or the application can send a query to the ADDS entity to check if any data is pending to be delivered and request the message details or request the actual messages to be delivered.

Data Transfer without Registration

In one embodiment, it is possible for an application to send a data transfer request without registering the source application. In such case, the ADDS may check with the HSS 116/UDR and PCRF 334 for authorization before attempting to deliver the message.

It may also be possible that the receiving application is also not registered. This is the case where the reserved application identifier is used, for example. Here, the data transfer request message may additionally have a device identifier so that the message gets delivered to the correct end node and the application in that end node that is marked for the reserved application identifier receives the messages.

However, in both these cases, the sending and receiving end nodes should have indicated their ADDS capability to the network.

Figure 15:
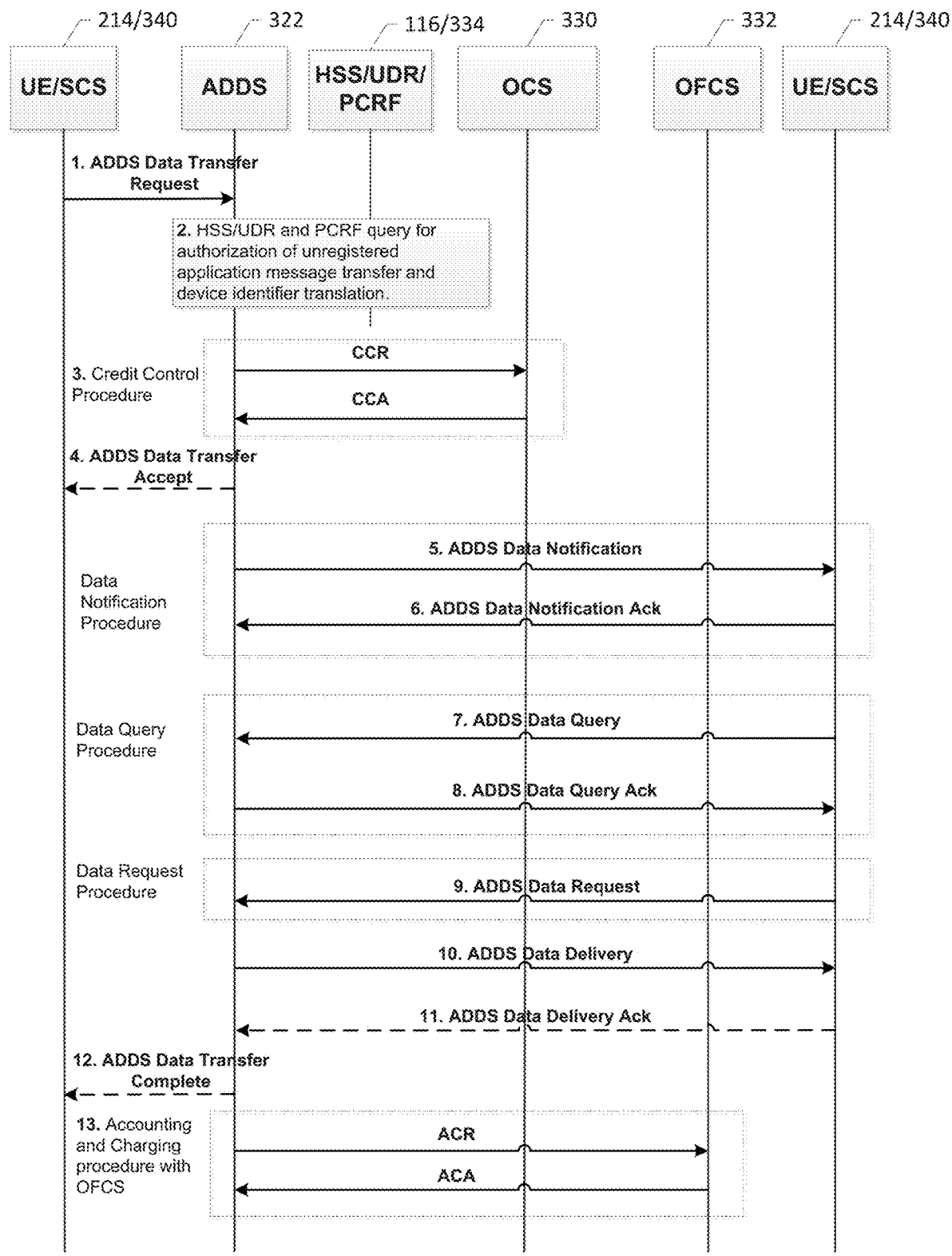
FIG. 15 is a flow diagram illustrating an ADDS data transfer process in accordance with one embodiment.

FIG. 15 is a flow diagram illustrating the ADDS data transfer process in accordance with one embodiment, including the data message notification, query, and request portions of the procedure.

As shown, in step 1, the ADDS client in the UE or SCS 340 sends an ADDS Data Transfer Request to the ADDS entity 322. As described above, the ADDS client chooses the transport mechanism/path in the manner described above the Path Selection section. For example, the ADDS client may select a transport mechanism/path based on various criteria, including, for example, the size of the message, condition of the transport paths and the device status (if it is in idle mode etc.). In one embodiment, the following information is sent in this message:

a. ADDS Message Type:
This indicates that the message is an 'ADDS Data Transfer Request' message.
b. Source Application Identifier:
The application identifier fetched by the application during its application registration procedure or a reserved application identifier
c. Destination Application Identifier:
The application identifier to which the application intends to the send the data.
d. Destination Device Identifier
This is an optional field and is included if the 'Destination Application Identifier' is a reserved application identifier. This field is described in step 3 of FIG. 13.
e. Application Data:
Application specific data which contains the actual data that needs to be delivered to the end application.
f. Application Data Characteristics:
The characteristics of the data and delivery instructions are provided in this IE. The message importance may be provided as:
  i. Critical
  ii. Normal
  iii. Dispensable
Additionally the time of delivery or notification to the end application may also be provided. A message validity field may also be provided so that the message is deleted from the ADDS entity if it could not be delivered within the validity period.
g. Submit Status Notification
This flag indicates if the ADDS entity should send an acknowledgement to the source application about the successful reception of the ADDS message.

h. Delivery Status Notification

Indicates the ADDS entity if the source application wishes to receive a delivery report after the message has been successfully delivered to the destination application.

In step 2, the ADDS entity may check with the HSS 116/UDR and PCRF 334 for authorization information if the sending application and/or the receiving application has not been registered previously. This procedure is similar to the checks done in the method described in FIG. 13. This procedure may also be used to translate the 'Destination Device Identifier' into a local identifier, such as IMSI/SCS ID.

In step 3, if online charging is used then the ADDS entity may perform the credit control procedure described in 3GPP TS 32.296 for the authorization of the ADDS data transfer procedure.

In step 4, the ADDS Server sends the ADDS Data Transfer Accept message acknowledging that the message was accepted for delivery. This is an optional message and is sent only if the 'Submit Status Notification' flag is set in the 'ADDS Data Transfer Request' message. The message could contain an error code if the server identified the destination application identifier as invalid or enough credits are not available. The error code might also notify if the requesting functionality (as requested in the Application Data Characteristics field) was not supported. The ADDS entity may store the message or send a notification or attempt to deliver the message as per the application characteristics and network conditions.

In step 5, the ADDS entity sends an 'ADDS Data Notification' message to the receiving end node if the receiving end node has requested for such notifications. In the present embodiment, this message contains the following information:
  a. Message Size
  b. Message Identification Number (This can be the sequence number of the message or a temporary identifier that is allocated by the ADDS)
  c. Sending Application Identifier
  d. Receiving Application Identifier
  e. Message Criticality
  f. Message Validity In step 6, the end node sends an 'ADDS Data Notification Ack' message indicating that it has noted the message. This message may also optionally contain a flag that the indicated message has to be immediately delivered and another optional time period value to indicate that the message has to be delivered at that time. If immediate delivery is requested then the steps from 10 onward are performed at this point.

Otherwise, in step 7, the ADDS client may send an 'ADDS Data Query' message to the ADDS entity to request information about the pending messages or delivery of the pending messages.

In step 8, the ADDS entity sends an 'ADDS Data Query' Ack message providing information about the pending messages. This message may contain information as listed in step 5 for each of the pending messages. If actual message delivery was requested then the steps from step 10 onward are performed.

In step 9, an end node may send a 'Data Request' message to the ADDS entity and request the delivery of a specific message that it was previously notified about (as in step 5 above) or learned in the ADDS query message in step 7. This message may contain the 'Message Identification Number' to identify the message that is being requested. The steps from step 10 onward are performed after the reception of this message.

In step 10, the ADDS entity sends an 'ADDS Data Delivery' message to deliver the application data. The ADDS entity may select the transport path for the data delivery. The ADDS entity uses the destination application identifier to find the end node addressing information for the selected path like MSISDN for SMS, IMSI for NAS and IP Address for User Plane, from its mapping table. The ADDS entity 322 may build the message (such as the IP header) for the selected path and send the message. The following information may be present in this message. Some of this information is described above in step 1:
  a. ADDS Message Type:
     This indicates that the message is an 'ADDS Data Delivery' message.
  b. Source Application Identifier:
  c. Destination Application Identifier:
  d. Application Data:
  e. Application Data Characteristics:
     Some of the information listed in step 1, such as 'Message Importance' may be provided.
  f. Delivery Status Indication
     This flags indicates if the receiving node should acknowledge the successful receipt of the ADDS message.

In step 11, the end node sends an 'ADDS Data Delivery Ack' message to indicate the message has been successfully handled/delivered to the end application. This message may contain an error code if the there is an error in handling message like any decoding failure or if the end application (indicated by the 'Destination Application Identifier') is not available.

This message may also be enhanced to carry a reply data packet to the source application. In this case this message may contain information as listed step 1. Some of the information like the source application ID, destination application ID may be omitted and this can be filled in by the ADDS entity. For this purpose the ADDS entity may retain the actual message until it receives the 'ADDS Data Delivery Ack' message. If data is sent in this message then it may be considered similar to an 'ADDS Data Transfer Request' message and steps from step 1 may be followed.

In step 12, the ADDS entity provides a delivery report to the source application to indicate the successful delivery of the message by sending an 'ADDS Data Transfer Complete' message to the originating application. This message may contain a timestamp of the message delivery.

Lastly, the ADDS entity may provide the charging details to the OFCS 332 for charging purposes of the ADDS message delivery.

Adds Event Subscription

Figure 16:
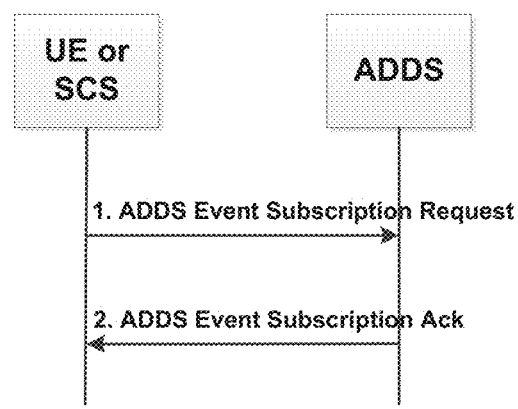
FIG. 16 illustrates a method for ADDS event subscription, in accordance with one embodiment thereof

FIG. 16 illustrates a method for ADDS event subscription, in accordance with one embodiment thereof. An application may send an event subscription to the ADDS 322 and provide a list of application identifiers for which it should be notified of events occurring with those applications, such as de-registration for example. The ADDS entity 322 stores this information in its memory and sends a notification about the event to the requested application.

Referring to FIG. 16, at step 1, an end node (e.g., a UE 214 or SCS 340) sends an 'ADDS Event Subscription Request' message to the ADDS entity. This message may contain the following information a. Source Application ID: The application that needs to be notified.
b. Source Device ID: This field is optional and is included if the source application is not registered with ADDS or if a reserved application ID is used.
c. Event Subscription List
   i. Target Application ID
   ii. Target Device ID: This may be included if the target application ID is not known. For example if the SCS wants to know about the application registration events from a UE then the SCS may provide the UE's external identifier so that the SCS is notified when the UE registers an application (as mentioned above in connection with the description of FIG. 13).
   iii. Subscribed Events: The list of events for which a notification is required. In one embodiment, the events may be:
   1. Application Registration
   2. Application De-Registration
   3. Application Movement (e.g., application changing the host device)

In step 2, the ADDS entity sends an 'ADDS Event Subscription Ack' message to provide the list of accepted events.

Application De-Registration

Figure 17:
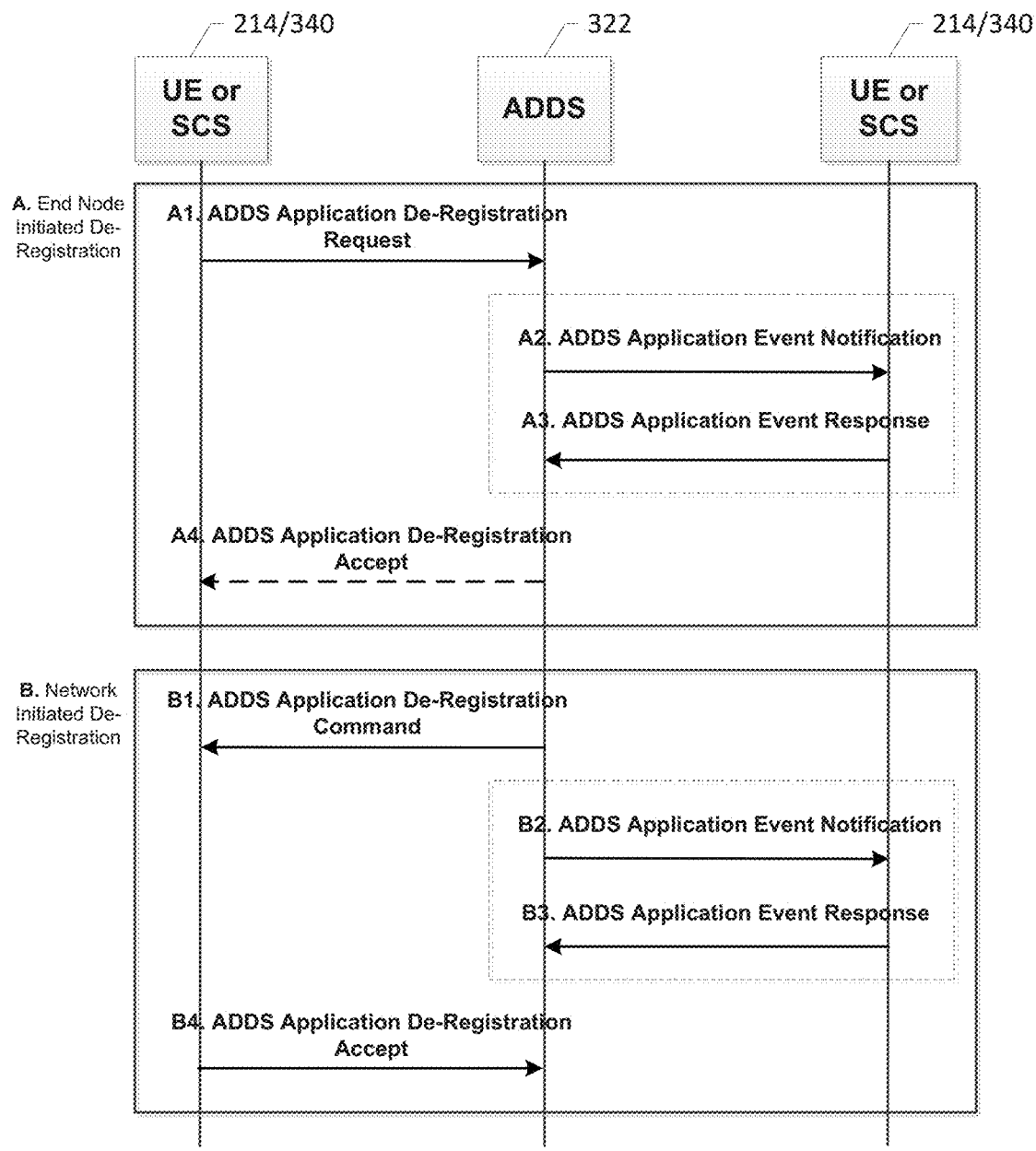
FIG. 17 illustrates embodiments of a method for application de-registration initiated by an end node or by the network.

FIG. 17 illustrates a method for application de-registration. De-registration may be initiate by an end node (step A1-A4 in FIG. 17) or by the network (steps B1-B4 in FIG. 17). The application de-registration procedure enables end nodes to gracefully end their usage of ADDS. When an application deregisters, the ADDS entity 322 frees the allocated Application ID and removes the transport mappings associated with it. The ADDS entity may also notify other interested applications about the de-registration.

In one embodiment, the ADDS client may remove any application specific data (like the mapping details of the Application ID and Device info) and inform the application about the end of the procedure.

In one embodiment, the network may initiate this procedure for any of the following reasons:
1. ADDS subscriptions withdrawal
2. Application ID lease time expiry
3. Based on Policies indicated from PCRF
4. Indications from OCS about unavailability of credits Also in one embodiment, this procedure may be initiated by an end node for any of the following reasons:
1. Application shutdown
2. ADDS client shut down
3. Indication from application Note that in some scenarios, an application may only want to close the ADDS communication while it may continue its regular data communication over the user plane path.

When an application is de-registered, interested applications or end nodes may be notified about it. The applications or end nodes that are to be notified may be decided based on:
1. A list provided by the application being de-registered.
2. Event subscriptions from other applications as mentioned above in connection with FIG. 16.
3. Subscription information from the HSS/UDR End Node Initiated De-Registration Steps A1-A4 of FIG. 17 illustrate end node initiated de-registration. As shown, in step A1, the ADDS end node sends an 'ADDS Application De-Registration Request' message to the ADDS entity 322. This message may contain the following information:
a. Message Type:
This would be set to 'ADDS Application De-Registration Request'.
b. Cause of De-Registration:
The reason for the de-registration like ADDS client shut down or application shut down etc.
c. De-Registration Response Flag:
This flag indicates if the ADDS end node expects a De-Registration response. Some small/constrained devices may set this flag to FALSE indicating the ADDS entity to not send the response. This flag may also be set to FALSE when the ADDS client is shut-down.
d. Application Identifier:
The application identifier which needs to be de-registered.
e. Notification List:
A list of other application identifiers that need to be notified about de-registration. If the ADDS client is shut down then a list of the 'Application Identifier' and 'Notification List' for each application ID may be provided.

In step A2, the ADDS entity 322 sends an 'ADDS Application Event Notification' message to the applications/end nodes that are to be notified. This message may contain the following information:
a. Destination Application ID:
The destination application that should receive this notification
b. Occurred Event Type:
This would be set to 'Application De-Registration'
c. Cause of De-Registration
d. Affected Application ID:
The application ID which is being de-registered.
e. Device information:
This may contain information about the end node on which the application was residing.

In step A3, the end node sends an 'ADDS Application Event Notification Ack' message to the ADDS entity 322 to confirm that it has received the event notification message.

Lastly, in step A4, the ADDS entity sends an 'ADDS De-Registration Accept' Message to the end node to inform that the de-registration procedure is complete.

Network Initiated De-Registration

Steps B1-B4 of FIG. 17 illustrate network initiated de-registration. As shown, in step B1, the ADDS entity 322 sends an 'ADDS Application De-Registration Command' message to the end node and this message may contain the following information:
a. Affected Application ID:
The application ID being deregistered. A list of these IDs may be provided if more than one application is being de-registered.
b. De-Registration Cause In step B2, the ADDS entity may send an 'ADDS Application Event Notification' to the applications/end nodes that are to be notified. This message is described in step A2 above. This message and the 'ADDS Application De-Registration Command' in step B1 above may be sent simultaneously and the order does not matter.

In step B3, the end node sends an 'ADDS Application Event Notification Ack' message to the ADDS entity to confirm that it has received the event notification message.

In step B4, the ADDS client sends an 'ADDS De-Registration Command Accept' Message to the end node to inform that the de-registration procedure is complete.

Other Features

The introduction of ADDS in the EPC and the features of ADDS can be beneficial for M2M type communications. The ADDS can be enhanced to provide specialized functions/services for M2M communication.

As one example, the ADDS can act as a repository and maintain some information related to M2M devices and M2M gateways. When the SCS queries for such information using a ADDS message, the ADDS can peak into the message, find the resource name that is being queried and provide this information autonomously without even forwarding this query to the end M2M gateway or the end M2M device application.

This way the ADDS can act as proxy to some M2M applications and respond to certain queries. Hence when devices are offline some data may still be fetched.

This approach may save the number of messages that are sent over the air and save the radio resources, network resources and device battery power. For example if the same resource information is queried by multiple network side applications the ADDS can fetch this information once and forward this to all the requesting applications without actually sending the requesting to the end M2M GW.

As a second example, ADDS can assist in application discovery or M2M service discovery. Whenever an M2M application registers with the ADDS, the ADDS can store information about the application and maintain a repository about all the application types and their details. A new M2M application that wants to find an M2M service or M2M application can query the ADDS and find the service or the application.

As a third example, an application on a M2M device may have the FQDN of the SCS to which it needs to establish a communication. Instead of the M2M device performing a DNS Query, it can send an ADDS message with the destination device identifier as the SCS FQDN. The ADDS may resolve the FQDN and forward the message to the SCS. This feature saves the DNS resolution procedure on the M2M device and reduces the number of messages over the air.

As a fourth example, the ADDS can receive the bootstrapping parameters from the SCS and securely pass it to the M2M applications when they register with the ADDS.

Example Node and Network Entity Architectures

Figure 18:
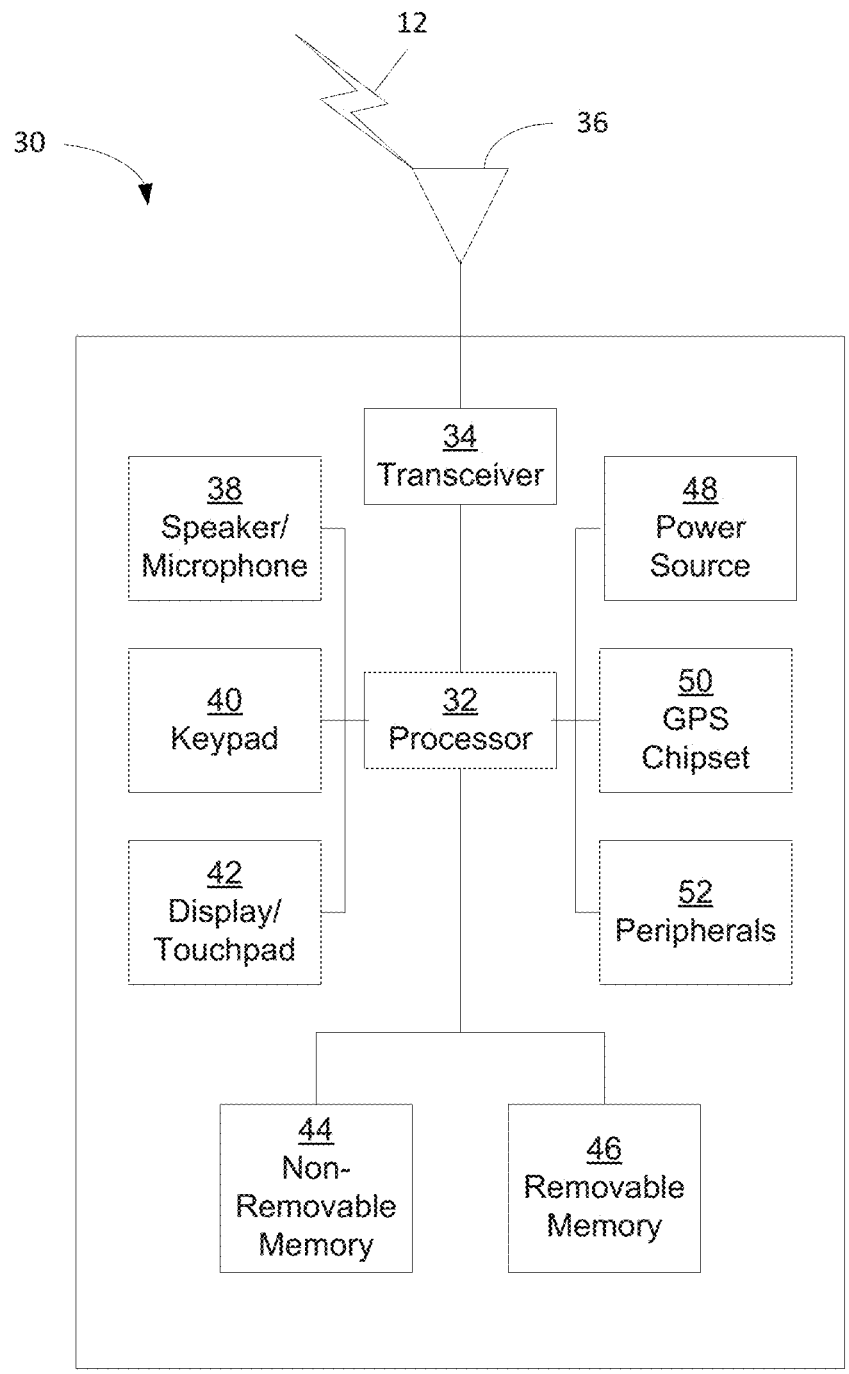
FIG. 18 is a diagram of an example end node on which an ADDS client may reside.

FIG. 18 is a diagram of an example end node 30 on which an ADDS client 324 may reside, such as a UE (e.g., UEs 104, 214, 312, 318 in FIGS. 1-4A-D) or other end node device. As shown in FIG. 18, the end node 30 may include a processor 32, a transceiver 34, a transmit/receive element 36, a speaker/microphone 38, a keypad 40, a display/touchpad 42, non-removable memory 44, removable memory 46, a power source 48, a global positioning system (GPS) chipset 50, and other peripherals 52. It will be appreciated that the end node 40 may include any sub-combination of the foregoing elements while remaining consistent with an embodiment.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the end node 30 to operate in a wireless environment. The processor 32 may be coupled to the transceiver 34, which may be coupled to the transmit/receive element 36. While FIG. 18 depicts the processor 32 and the transceiver 34 as separate components, it will be appreciated that the processor 32 and the transceiver 34 may be integrated together in an electronic package or chip. The processor 32 may perform application-layer programs, e.g., browsers, and/or radio access-layer (RAN) programs and/or communications. The processor 32 may perform security operations such as authentication, security key agreement, and/or cryptographic operations, such as at the access-layer and/or application layer for example.

The transmit/receive element 36 may be configured to transmit signals to, or receive signals from, another peer. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 18 as a single element, the end node 30 may include any number of transmit/receive elements 36. More specifically, the end node 30 may employ MIMO technology. Thus, in an embodiment, the end node 30 may include two or more transmit/receive elements 36, e.g., multiple antennas, for transmitting and receiving wireless signals.

The transceiver 34 may be configured to modulate the signals that are to be transmitted by the transmit/receive element 36 and to demodulate the signals that are received by the transmit/receive element 36. As noted above, the end node 30 may have multi-mode capabilities. Thus, the transceiver 34 may include multiple transceivers for enabling the end node 30 to communicate via multiple RATs, such as UTRA and IEEE 802.11 or 802.15, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the end node 30, such as on a server or a home computer.

The processor 32 may receive power from the power source 48, and may be configured to distribute and/or control the power to the other components in the end node 30. The power source 48 may be any suitable device for powering the end node 30. For example, the power source 48 may include one or more dry cell batteries, e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information, e.g., longitude and latitude, regarding the current location of the end node 30. It will be appreciated that the end node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 19:
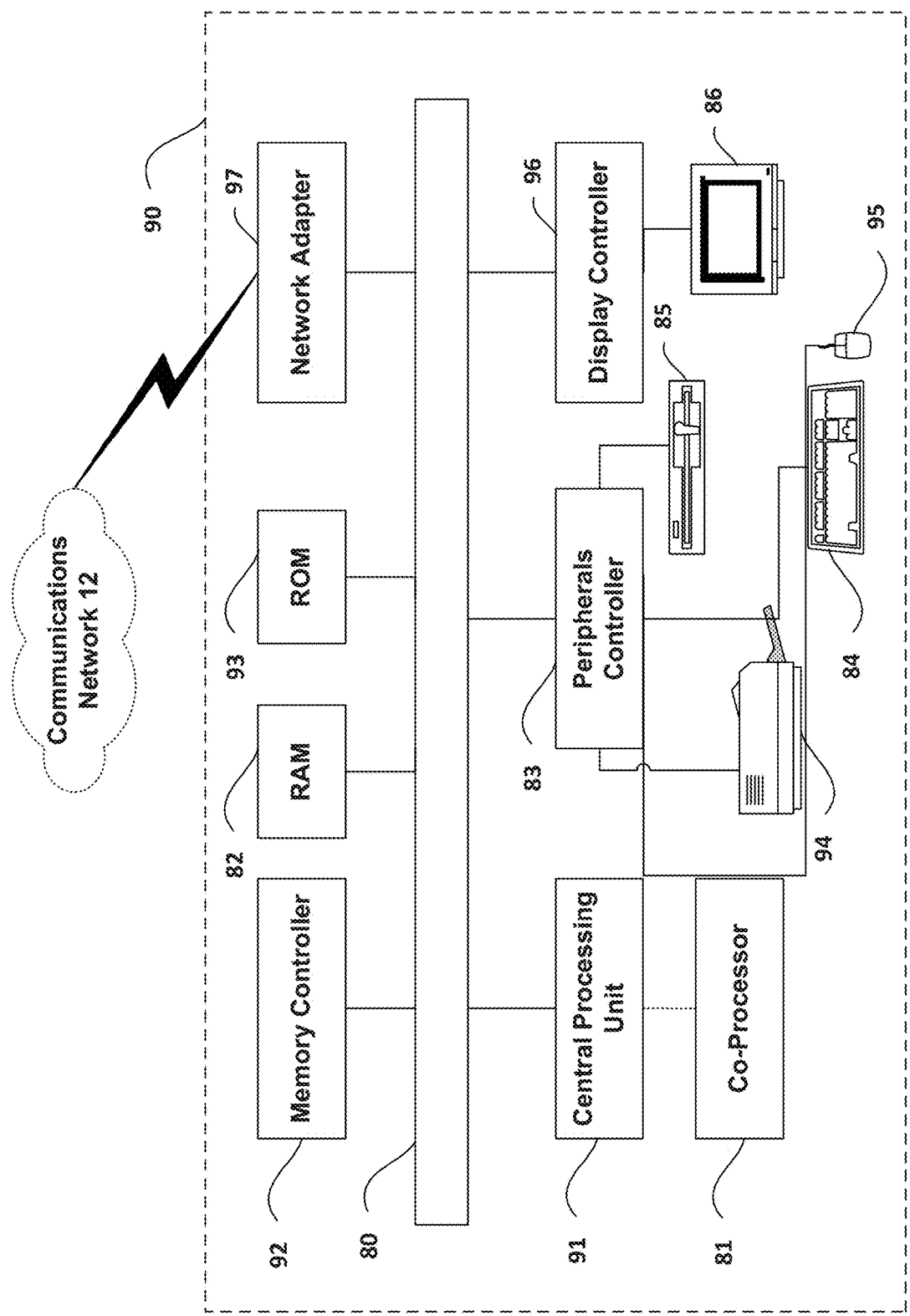
FIG. 19 is a block diagram of a computer system or server that may be used to implement any of the core network nodes or end points illustrated in FIGS. 1-17, including any node on which the ADDS entity or an ADDS client may be implemented.

FIG. 19 is a block diagram of a computer system or server that may be used to implement any of the core network nodes illustrated in FIGS. 1-4A-D, including any node on which the ADDS entity 322 may be implemented or in the case of an ADDS entity 322 that operates as a standalone node in the network. The computer system or server of FIG. 19 may be controlled primarily by computer readable instructions, which may be in the form of software, wherever, or by whatever means such software is stored or accessed. Such computer readable instructions may be executed within a processor, such as central processing unit (CPU) 91, to cause computer system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91 that performs additional functions or assists CPU 91. CPU 91 and/or coprocessor 81 may receive, generate, and process data in connection with P2P communications.

In operation, CPU 91 fetches, decodes, and executes instructions, and transfers information to and from other resources via the computer's main data-transfer path, system bus 80. Such a system bus connects the components in computer system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computer system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computer system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86. Further, computer system 90 may contain network adaptor 97 that may be used to connect computer system 90 to an external communications network.

It is understood that any or all of the systems, methods and processes described herein, including the ADDS client 324 and ADDS entity 322, may be embodied in the form of computer executable instructions, e.g., program code, stored on a computer-readable storage medium which instructions, when executed by a machine, such as a computer, server, peer, processor, or the like, perform and/or implement the systems, methods and processes described herein. Specifically, any of the steps, operations or functions described herein may be implemented in the form of such computer executable instructions. Computer readable storage media include volatile and nonvolatile, removable and non-removable media implemented in any method or technology for storage of information, but such computer readable storage media do not includes signals. Computer readable storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other physical medium which can be used to store the desired information and which can be accessed by a computer.

What is claimed:

1. A user equipment comprising a processor and a memory, the memory storing computer executable instructions which, when executed by the processor, cause the user equipment to provide an application data delivery service for enabling communication between a first application that is hosted on the user equipment and a second application, the application data delivery service being configured to perform operations comprising:

receiving, from the first application on a first interface that comprises an application programing interface exposed by the application data delivery service to the first application, a first request to send a packet to the second application via a communications network, the first request comprising an indication of whether the first application desires the packet to be acknowledged and an identifier of the second application;

encoding, based on the first request, a header comprising the indication of whether the packet should be acknowledged, the identifier of the second application, and a field that is used to support sequencing of packets; and sending, to a mobility management entity of the communications network, via a Non-Access Stratum (NAS) Message, a second request requesting that the packet be sent to the second application, the second request comprising the packet and the header.

2. The user equipment of claim 1, wherein the instructions, when executed, further cause the application data delivery service to perform operations comprising:

receiving, at the user equipment, a message with an indication that the application data delivery service is supported in the PDN connection.

3. The user equipment of claim 2, wherein the message with the indication to the user equipment is sent in a protocol configuration options (PCO) field in response to a packet data network (PDN) connectivity request.

4. The user equipment of claim 3, wherein the message with the indication includes a maximum packet size.

5. The user equipment of claim 1, wherein the first request comprises at least one of an indication of whether or not the packet can be buffered by the application data delivery service, how long the packet is valid and a priority of the packet.

6. The user equipment of claim 1, wherein the application data delivery service responds to the first application to indicate that the first request to send a packet has been accepted for delivery.

7. The user equipment of claim 1, wherein if the first request includes an indication that the request is delay tolerant, the application data delivery service buffers the request until the first application becomes reachable.

8. The user equipment of claim 1, wherein the application data delivery service receives an acknowledgement of the packet from the communications network.

9. The user equipment of claim 8, wherein the application data delivery service, after receiving the acknowledgement from the communications network, sends an indication to the first application that sending of the packet is complete.

10. The user equipment of claim 1, wherein the second request further comprises a second field that is used to support segmentation and re-assembly of packets.

11. A method implemented in a user equipment, the user equipment providing an application data delivery service for enabling communication between a first application that is hosted on the user equipment and a second application, the method comprising:

receiving, from the first application on a first interface that comprises an application programing interface exposed by the application data delivery service to the first application, a first request to send a packet to the second application via a communications network, the first request comprising an indication of whether the first application desires the packet to be acknowledged and an identifier of the second application;

encoding, based on the first request, a header comprising the indication of whether the packet should be acknowledged, the identifier of the second application, and a field that is used to support sequencing of packets; and sending, to a mobility management entity of the communications network, via a Non-Access Stratum (NAS) Message, a second request requesting that the packet be sent to the second application, the second request comprising the packet and the header.

12. The method of claim 11, further comprising:

receiving, at the user equipment, a message with an indication that the application data delivery service is supported in the PDN connection.

13. The method of claim 12, wherein the message with the indication to the user equipment is sent in a protocol configuration options (PCO) field in response to a packet data network (PDN) connectivity request.

14. The method of claim 13, wherein the message with the indication includes a maximum packet size.

15. The method of claim 11, wherein the first request comprises at least one of an indication of whether or not the packet can be buffered by the application data delivery service, how long the packet is valid and a priority of the packet.

16. The method of claim 11, wherein the application data delivery service responds to the first application to indicate that the first request to send a packet has been accepted for delivery.

17. The method of claim 11, wherein if the first request includes an indication that the request is delay tolerant, the application data delivery service buffers the request until the first application becomes reachable.

18. The method of claim 11, wherein the application data delivery service receives an acknowledgement of the packet from the communications network.

19. The method of claim 18, wherein the application data delivery service, after receiving the acknowledgement from the communications network, sends an indication to the first application that sending of the packet is complete.

20. The method of claim 11, wherein the second request further comprises a second field that is used to support segmentation and re-assembly of packets.

* * * * *